US012726617B2

(12) United States Patent
Liu et al.

(10) Patent No.: US 12,726,617 B2
(45) Date of Patent: Sep. 1, 2026

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, Los Angeles, CA (US); Kui Fan, Los Angeles, CA (US); Xiaolong Jiang, Beijing (CN); Haibin Yin, Beijing (CN); Yuwen He, Los Angeles, CA (US); Yingming Fan, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 168 days.

(21) Appl. No.: 18/284,511

(22) PCT Filed: Mar. 31, 2022

(86) PCT No.: PCT/CN2022/084648
§ 371 (c)(1),
(2) Date: Sep. 27, 2023

(87) PCT Pub. No.: WO2022/206928
PCT Pub. Date: Oct. 6, 2022

(65) Prior Publication Data

US 2024/0214565 A1 Jun. 27, 2024

(30) Foreign Application Priority Data

Apr. 1, 2021 (WO) ................ PCT/CN2021/085017

(51) Int. Cl.
*H04N 19/117* (2014.01)
*H04N 19/137* (2014.01)
(Continued)

(52) U.S. Cl.
CPC ......... *H04N 19/117* (2014.11); *H04N 19/137* (2014.11); *H04N 19/172* (2014.11); *H04N 19/176* (2014.11); *H04N 19/80* (2014.11)

(58) Field of Classification Search
CPC .. H04N 19/117; H04N 19/137; H04N 19/172; H04N 19/176; H04N 19/80;
(Continued)

(56) References Cited

U.S. PATENT DOCUMENTS

2005/0078755 A1* 4/2005 Woods ................ H04N 19/615 375/240.24
2013/0251282 A1* 9/2013 Min .......................... G06T 5/50 382/260

(Continued)

FOREIGN PATENT DOCUMENTS

CN 1934867 A 3/2007
CN 104952040 A 9/2015

(Continued)

OTHER PUBLICATIONS

Wennersten et al. ("AHG10: Encoder-only GOP-based temporal filter", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0549) (Year: 2019).*

(Continued)

*Primary Examiner* — Maria E Vazquez Colon
(74) *Attorney, Agent, or Firm* — Astute IP Law Group

(57) ABSTRACT

Embodiments of the present disclosure provide a solution for video processing. A method for video processing is proposed. The method comprises: obtaining a reference picture for a target picture of a video; determining whether the reference picture is to be used for filtering the target picture based at least in part on a difference between the reference picture and the target picture; and in accordance
(Continued)

with a determination that the reference picture is to be used for filtering the target picture, performing temporal filtering on the target picture based on the reference picture. Compared with the conventional solution, the proposed method can advantageously improve the coding speed and efficiency.

20 Claims, 12 Drawing Sheets

(51) Int. Cl.
*H04N 19/172* (2014.01)
*H04N 19/176* (2014.01)
*H04N 19/80* (2014.01)

(58) Field of Classification Search
CPC . G06T 2207/10016; G06T 2207/20182; G06T 5/50
See application file for complete search history.

(56) References Cited

U.S. PATENT DOCUMENTS

2016/0037059 A1* 2/2016 Lim .......................... G06T 5/50 348/241
2022/0224883 A1* 7/2022 Yea ...................... H04N 19/132
2024/0089489 A1* 3/2024 Xiu ...................... H04N 19/139

FOREIGN PATENT DOCUMENTS

CN 104952041 A 9/2015
CN 104952042 A 9/2015
JP 2009055145 A 3/2009
WO WO-2015051920 A1 * 4/2015 ........... H04N 19/523

OTHER PUBLICATIONS

Wennersten et al., "[AHG10] GOP-based temporal filter improvements", Joint Video Experts Team (JVET) of ITU-T SG 16 WP 3 and ISO/IEC JTC 1/SC 29, 21st Meeting, by teleconference, Jan. 6-15, 2021, Document: JVET-U0056 (Year: 2021).*
Alshina et al., "Performance of JEM1.0 tools analysis by Samsung," Joint Video Exploration Team (JVET) of ITU-T SG WP 3 and ISO/IEC JTC 1/SC 29/WG 11, 2nd Meeting: San Diego, USA, Feb. 20-26, 2016, Document: JVET-B0022, 27 pages.
International Search Report in PCT/CN2022/084648, mailed May 27, 2022, 4 pages.
Wennersten et al., "[AHG10] GOP-based temporal filter improvements," Joint Video Exploration Team (JVET) of TU-T SG WP 3 and ISO/IEC JTC 1/SC 29/WG 11, 21st Meeting: by teleconference Jan. 6-15, 2021, Document: JVET-U0056-v2, 4 pages.
Office Action for Chinese Patent Application No. 202280025259.4, mailed on Jun. 5, 2026, 19 pages.
Wang et al., "Novel adaptive one at a time search strategies for motion estimation", Computer Engineering and Applications, vol. 43, No. 11, May 16, 2007, 4 pages, with English Abstract.
Zhang et al., "Direct method for 3D motion estimation and depth reconstruction based on pyramid optical flow", Chinese Journal of Scientific Instrument, vol. 36, No. 5, Jun. 19, 2015, 13 pages, with English Abstract.

* cited by examiner (a) 4 parameter affine model (b) 6 parameter affine model

METHOD, DEVICE, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/084648, filed Mar. 31, 2022, which claims priority to International Patent Application No. PCT/CN2021/085017 filed with the China National Intellectual Property Administration (CNIPA) on Apr. 1, 2021, the disclosures of which are incorporated herein by reference in its entirety their entireties.

FIELD

Embodiments of the present disclosure relates generally to video coding techniques, and more particularly, to temporal filtering in video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding speed and efficiency of conventional video coding techniques is generally very low, which is undesirable.

SUMMARY

Embodiments of the present disclosure provide a solution for video processing.

In a first aspect, a method for video processing is proposed. The method comprises: obtaining a reference picture for a target picture of a video; determining whether the reference picture is to be used for filtering the target picture based at least in part on a difference between the reference picture and the target picture; and in accordance with a determination that the reference picture is to be used for filtering the target picture, performing temporal filtering on the target picture based on the reference picture. Compared with the conventional solution, the proposed method can advantageously improve the coding speed and efficiency.

In a second aspect, an electronic device is proposed. The electronic device comprises a processing unit; and a memory coupled to the processing unit and having instructions stored thereon which, when executed by the processing unit, cause the electronic device to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, a non-transitory computer-readable recording medium is proposed. The non-transitory computer-readable recording medium storing a bitstream of a video which is generated by a method in accordance with the first or second aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
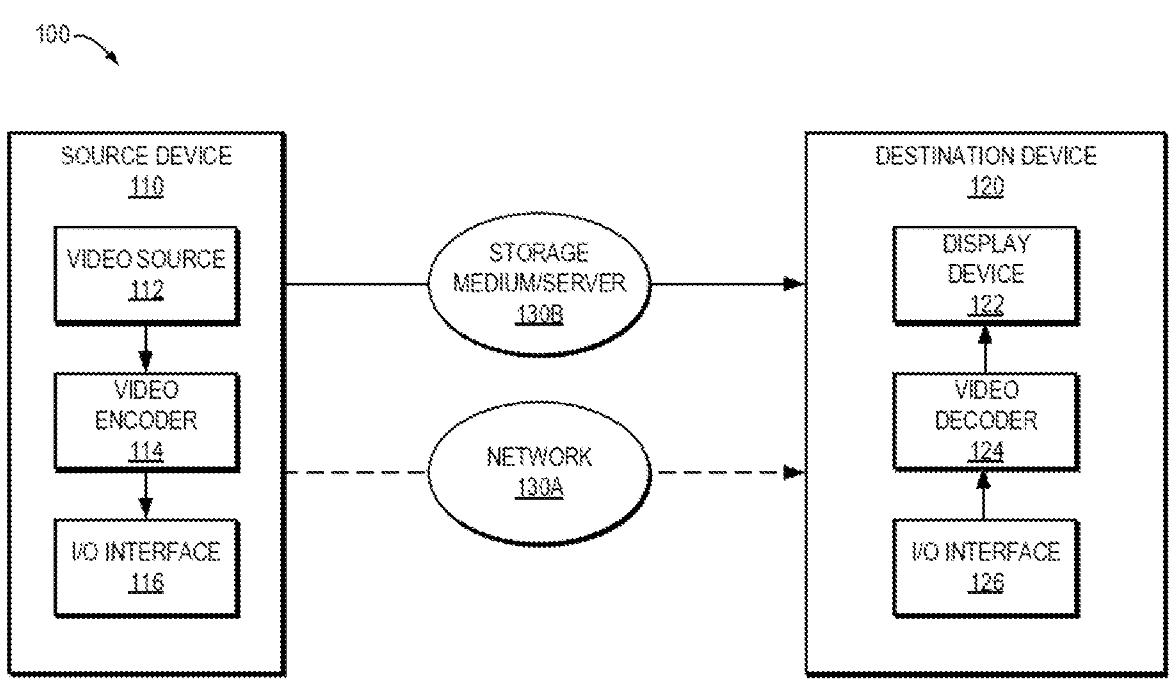
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
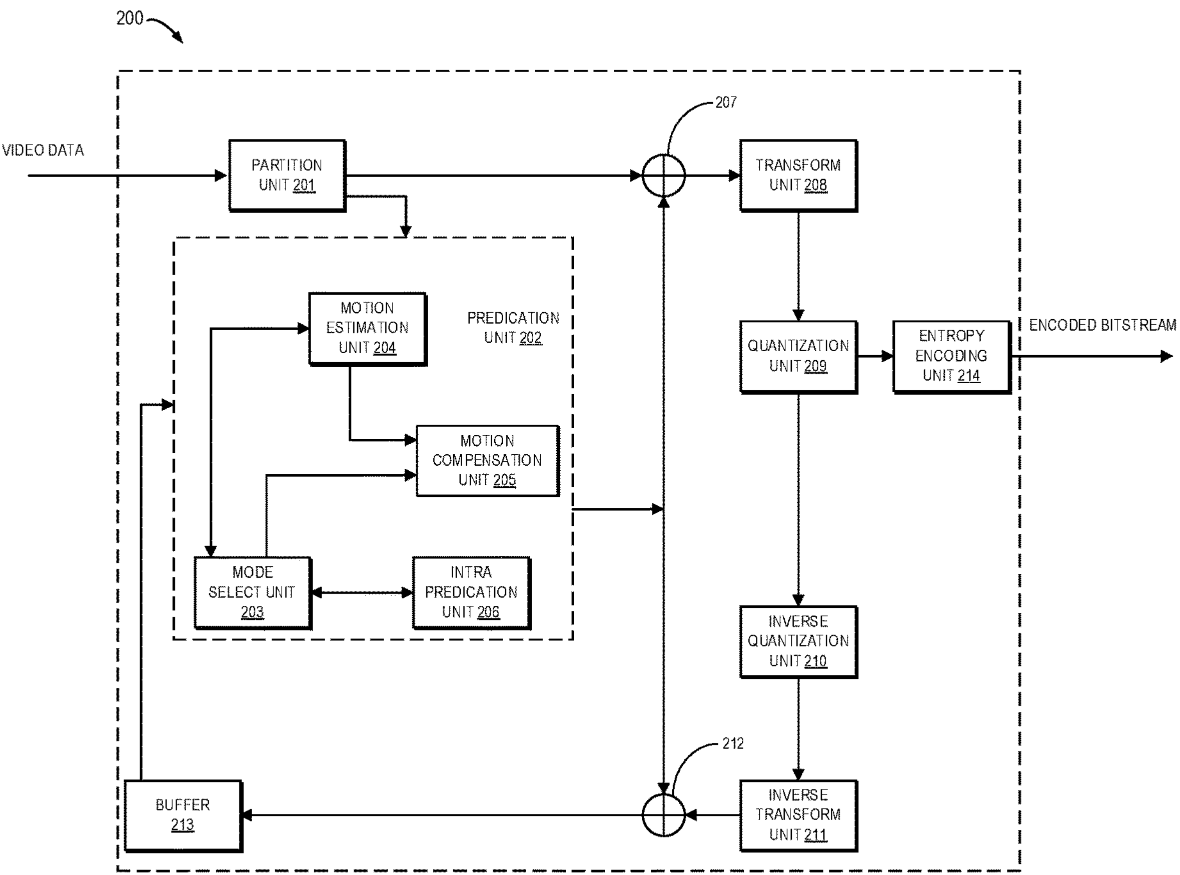
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the other video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, the video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, a loop filtering operation may be performed to reduce video blocking artifacts in the video block.

The entropy encoding unit 214 may receive data from other functional components of the video encoder 200. When the entropy encoding unit 214 receives the data, entropy encoding unit 214 may perform one or more entropy encoding operations to generate entropy encoded data and output a bitstream that includes the entropy encoded data.

Figure 3:
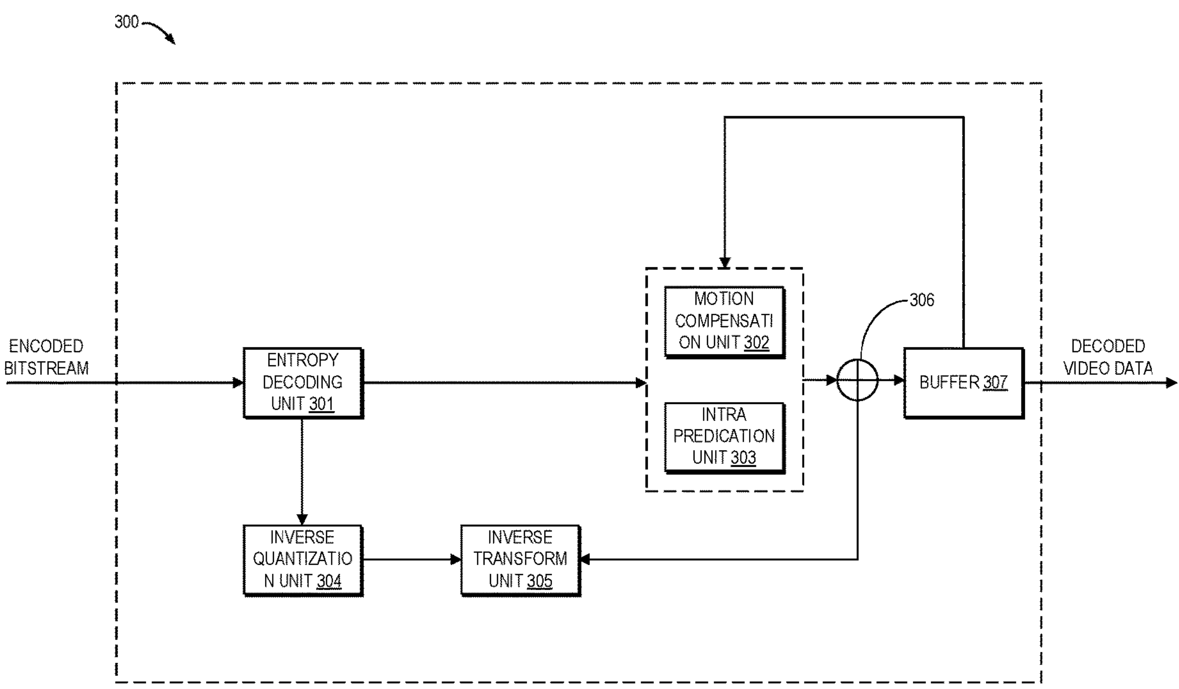
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to the video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related to temporal filtering in video coding. It may be applied to the existing video coding standard like H.264/AVC, HEVC, or the Versatile Video Coding. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards (see ITU-T and ISO/IEC, "High efficiency video coding", Rec. ITU-T H.265| ISO/IEC 23008-2 (in force edition); C. Rosewarne, etc., "High Efficiency Video Coding (HEVC) Test Model 16 (HM 16) Improved Encoder Description Update 7," JCTVC-Y1002, October 2016). Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) (see J. Chen, etc., "Algorithm description of Joint Exploration Test Model 7 (JEM7)," JVET-G1001, August 2017; JEM-7.0: https://jvet.hhi.fraunhofer.de/svn/svn_HMJEMSoftware/tags/HM-16.6-JEM-7.0). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 10) could be found at: https://jvet-experts.org/doc_end_user/documents/20_Teleconference/wg11/JVET-T2001-v2.z ip.

The latest reference software of VVC, named VTM, could be found at: https://vcgit.hhi.fraunhofer.de/jvet/VVCSoftware_VTM/tags/VTM-12.0.

2.1. Overlapped Block Motion Compensation

Figure 4:
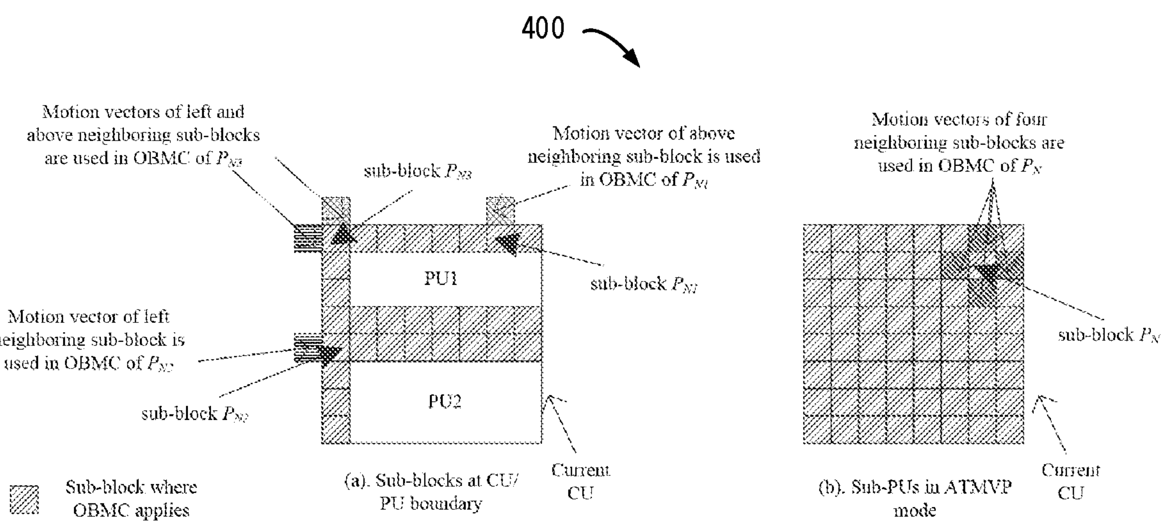
FIG. 4 illustrates sub-blocks where OBMC applies.

Overlapped Block Motion Compensation (OBMC) has previously been used in H.263. In the JEM, unlike in H.263, OBMC can be switched on and off using syntax at the Coding Unit (CU) level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. FIG. 4 illustrates a diagram 400 of sub-blocks where OBMC applies. To process CU boundaries in a uniform fashion, OBMC is performed at sub-block level for all MC block boundaries, where sub-block size is set equal to 4×4, as illustrated in FIG. 4.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with Advanced Motion Vector Prediction (AMVP) mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2. Affine Motion Compensated Prediction

Figure 5:
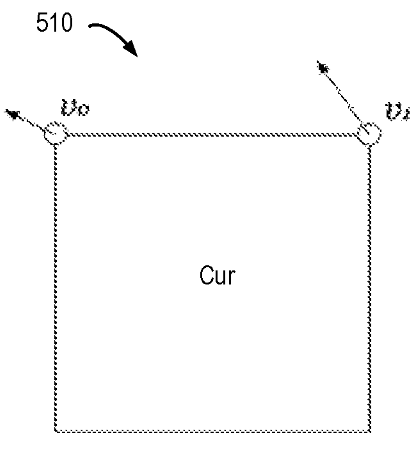
FIG. 5 illustrates a schematic diagram of control point based affine motion model.
Figure 5:
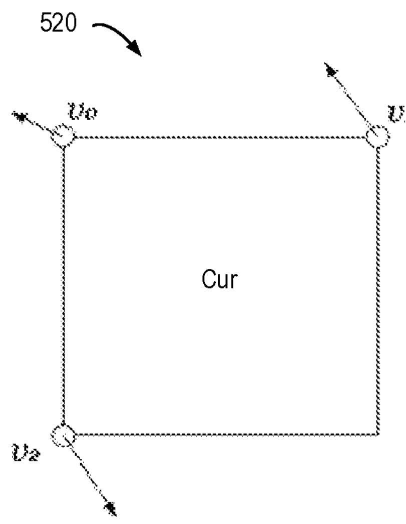

In HEVC, only translation motion model is applied for motion compensation prediction (MCP). While in the real world, there are many kinds of motion, e.g., zoom in/out, rotation, perspective motions and the other irregular motions. In VVC (see J. Chen, etc., "Algorithm description for Versatile Video Coding and Test Model 11 (VTM 11)," JVET-T2002, December 2020), a block-based affine transform motion compensation prediction is applied. FIG. 5 illustrates a schematic diagram of control point based affine motion model. As shown FIG. 5, the affine motion field of the block is described by motion information of two control point motion vectors (4-parameter) or three control point motion vectors (6-parameter).

For 4-parameter affine motion model 510, motion vector at sample location (x,y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad (2\text{-}1)$$

For 6-parameter affine motion model 520, motion vector at sample location (x,y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (2\text{-}2)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 6:
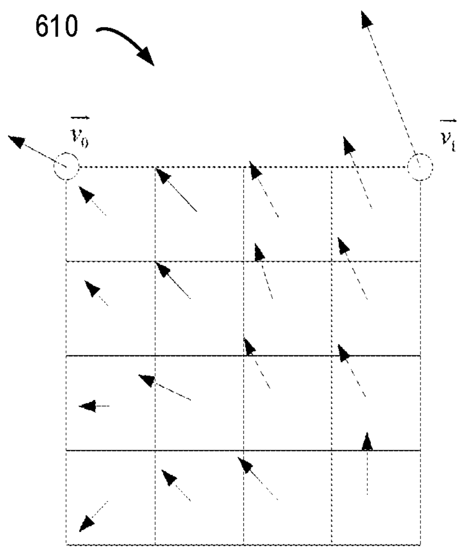
FIG. 6 illustrates a schematic diagram of affine MVF per subblock.

In order to simplify the motion compensation prediction, block based affine transform prediction is applied. FIG. 6 illustrates a schematic diagram of affine MVF per subblock. To derive motion vector of each 4×4 luma subblock 610, the motion vector of the center sample of each subblock, as shown in FIG. 6, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

2.2.1. Affine Merge Prediction

Figure 7:
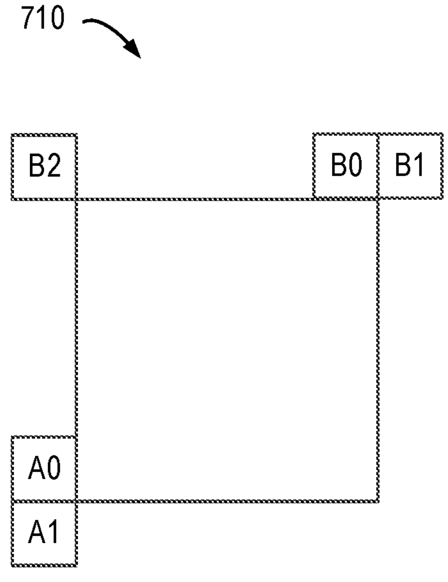
FIG. 7 illustrates a schematic diagram of locations of inherited affine motion predictors.

AF_MERGE mode can be applied for CUs with both width and height larger than or equal to 8. In this mode the control point motion vectors (CPMVs) of the current CU is generated based on the motion information of the spatial neighboring CUs. There can be up to five control point motion vector prediction (CPMVP) candidates and an index is signalled to indicate the one to be used for the current CU. The following three types of CPVM candidate are used to form the affine merge candidate list:

- Inherited affine merge candidates that extrapolated from the CPMVs of the neighbour CUs
- Constructed affine merge candidates CPMVPs that are derived using the translational MVs of the neighbour CUs
- Zero MVs In VVC, there are maximum two inherited affine candidates, which are derived from affine motion model of the neighboring blocks, one from left neighboring CUs and one from above neighboring CUs. FIG. 7 illustrates a schematic diagram of locations of inherited affine motion predictors. The candidate reference blocks are shown in 710 of FIG. 7.

Figure 8:
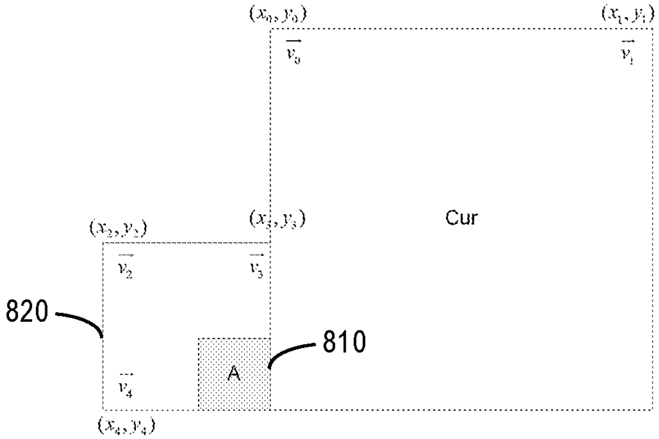
FIG. 8 illustrates a schematic diagram of control point motion vector inheritance.

For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. FIG. 8 illustrates a schematic diagram of control point motion vector inheritance. As shown in FIG. 8, if the neighbour left bottom block A 810 is coded in affine mode, the motion vectors $v_2$, $v_3$ and $v_4$ of the top left corner, above right corner and left bottom corner of the CU 820 which contains the block A 810 are attained. When block A 810 is coded with 4-parameter affine model, the two CPMVs of the current CU 820 are calculated according to $v_2$, and $v_3$. In case that block A 810 is coded with 6-parameter affine model, the three CPMVs of the current CU 820 are calculated according to $v_2$, $v_3$ and $v_4$.

Figure 9:
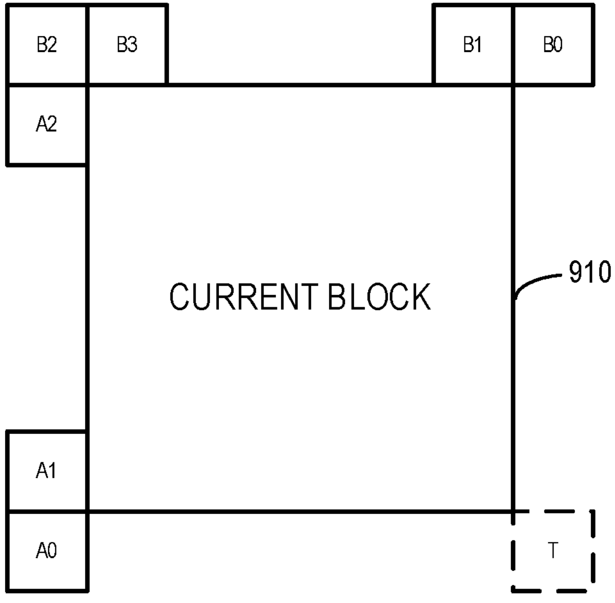
FIG. 9 illustrates a schematic block diagram of locations of candidates position for constructed affine merge mode.

Constructed affine candidate means the candidate is constructed by combining the neighbor translational motion information of each control point. FIG. 9 illustrates a schematic block diagram of locations of candidates position for constructed affine merge mode. The motion information for the control points is derived from the specified spatial neighbors and temporal neighbor shown in FIG. 9, which shows locations of candidates position for constructed affine merge mode for a current block 910. $CPMVR_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on those motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.2.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs Constructed affine AMVP candidates CPMVPs that are derived using the translational MVs of the neighbour CUs Translational MVs from neighboring CUs Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors shown in FIG. 9. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both availlalbe, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.2.3. Prediction Refinement with Optical Flow for Affine Mode

Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg \text{shift1}) - (I(i-1, j) \gg \text{shift1}) \quad (2\text{-}3)$$

$$g_y(i, j) = (I(i, j+1) \gg \text{shift1}) - (I(i, j-1) \gg \text{shift1}) \quad (2\text{-}4)$$

shift1 is used to control the gradient's precision. The subblock (i.e., 4×4) prediction is extended by one sample on each side for the gradient calculation. To avoid additional memory bandwidth and additional interpolation computation, those extended samples on the extended borders are copied from the nearest integer pixel position in the reference picture.

Figure 10:
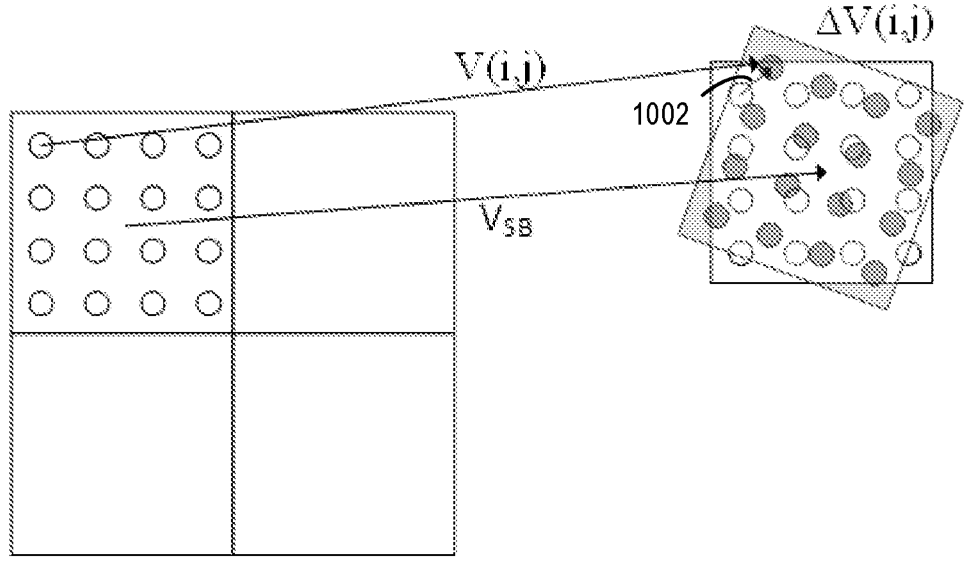
FIG. 10 illustrates a schematic block diagram of subblock MV $V_{SB}$ and pixel $\Delta v(i,j)$.

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (2\text{-}5)$$

where the $\Delta v(i,j)$ is the difference between sample MV computed for sample location (i,j), denoted by v(i,j), and the subblock MV of the subblock to which sample (i,j) belongs, as shown in FIG. 10 which illustrates a schematic block diagram of subblock MV $V_{SB}$ and pixel $\Delta v(i,j)$ (denoted as an arrow 1002 in FIG. 10). The $\Delta v(i,j)$ is quantized in the unit of 1/32 luam sample precision.

Since the affine model parameters and the sample location relative to the subblock center are not changed from subblock to subblock, $\Delta v(i,j)$ can be calculated for the first subblock, and reused for other subblocks in the same CU. Let dx(i,j) and dy(i,j) be the horizontal and vertical offset from the sample location (i,j) to the center of the subblock $(x_{SB}, y_{SB})$, $\Delta v(x,y)$ can be derived by the following equation, $$\begin{cases} dx(i, j) = i - x_{SB} \\ dy(i, j) = j - y_{SB} \end{cases} \quad (2\text{-}6)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (2\text{-}7)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \frac{v_{1x} - v_{0x}}{w} \\ E = -D = \frac{v_{1y} - v_{0y}}{w} \end{cases} \quad (2\text{-}8)$$

For 6-parameter affine model, $$\begin{cases} C = \frac{v_{1x} - v_{0x}}{w} \\ D = \frac{v_{2x} - v_{0x}}{h} \\ E = \frac{v_{1y} - v_{0y}}{w} \\ F = \frac{v_{2y} - v_{0y}}{h} \end{cases} \quad (2\text{-}9)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i,j)$ is added to the subblock prediction I(i,j). The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.3. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The distances (i.e. POC difference) from two reference pictures to the current picture are same Both reference pictures are short-term reference pictures.

The CU is not coded using affine mode or the SbTMVP merge mode

CU has more than 64 luma samples

Both CU height and CU width are larger than or equal to 8 luma samples

BCW weight index indicates equal weight

WP is not enabled for the current CU

CIIP mode is not used for the current CU

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, i.e., $$\begin{aligned} \frac{\partial I^{(k)}}{\partial x}(i, j) &= \left(\left(I^{(k)}(i+1, j) \gg \text{shift1}\right) - \left(I^{(k)}(i-1, j) \gg \text{shift1}\right)\right) \\ \frac{\partial I^{(k)}}{\partial y}(i, j) &= \left(\left(I^{(k)}(i, j+1) \gg \text{shift1}\right) - \left(I^{(k)}(i, j-1) \gg \text{shift1}\right)\right) \end{aligned} \quad (2\text{-}10)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as $$S_1 = \sum_{(i,j)\in\Omega} \mathrm{Abs}(\psi_x(i,j)),\ S_3 = \sum_{(i,j)\in\Omega} \theta(i,j)\cdot\mathrm{Sign}(\psi_x(i,j)) \tag{2-11}$$

$$S_2 = \sum_{(i,j)\in\Omega} \psi_x(i,j)\cdot\mathrm{Sign}(\psi_y(i,j))$$

$$S_5 = \sum_{(i,j)\in\Omega} \mathrm{Abs}(\psi_y(i,j)),\ S_6 = \sum_{(i,j)\in\Omega} \theta(i,j)\cdot\mathrm{Sign}(\psi_y(i,j))$$

where $$\psi_x(i,j) = \left(\frac{\partial I^{(1)}}{\partial x}(i,j) + \frac{\partial I^{(0)}}{\partial x}(i,j)\right) \gg n_a \tag{2-12}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where Ω is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0?\ \mathrm{clip3}\left(-th'_{BIO},\ th'_{BIO},\ -((S_3\cdot 2^{n_b-n_a}) \gg \lfloor \log_2 S_1 \rfloor)\right) : 0 \tag{2-13}$$

$$v_y = S_5 > 0?\ \mathrm{clip3}\left(-th'_{BIO},\ th'_{BIO},\ -\left(\left(S_6\cdot 2^{n_b-n_a} - \left((v_x S_{2,m}) \ll n_{S_2} + v_x S_{2,s}\right)/2\right) \gg \lfloor \log_2 S_5 \rfloor\right)\right) : 0$$

where $$S_{2,m} = S_2 \gg n_{S_2},\ S_{2,s} = S_2\ \&\left(2^{n_{S_2}} - 1\right),\ th'_{BIO} = 2^{max(5,BD-7)}.$$

$\lfloor \bullet \rfloor$ is the floor function, and $n_{s_2}=12$.

Based on the motion refinement and the gradients, the following adjustment is calculated for each sample in the 4×4 subblock:

$$b(x,y) = rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right) \tag{2-14}$$

Finally, the BDOF samples of the CU are calculated by adjusting the bi-prediction samples as follows:

$$pred_{BDOF}(x,y) = \left(I^{(0)}(x,y) + I^{(1)}(x,y) + b(x,y) + o_{offset}\right) \gg \mathrm{shift} \tag{2-15}$$

These values are selected such that the multipliers in the BDOF process do not exceed 15-bit, and the maximum bit-width of the intermediate parameters in the BDOF process is kept within 32-bit.

Figure 11:
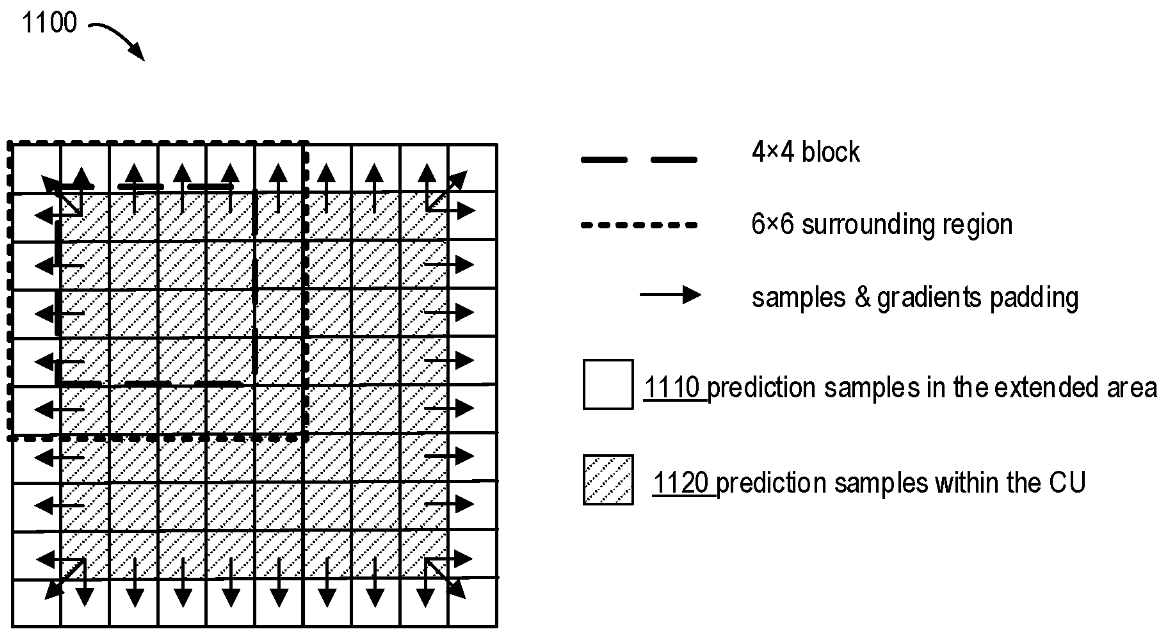
FIG. 11 illustrates a schematic diagram of extended CU region used in BDOF.

In order to derive the gradient values, some prediction samples $I^{(k)}(i,j)$ in list k (k=0,1) outside of the current CU boundaries need to be generated. FIG. 11 illustrates a schematic diagram of extended CU region used in BDOF. As depicted in the diagram 1100 of FIG. 11, the BDOF in VVC uses one extended row/column around the CU's boundaries. In order to control the computational complexity of generating the out-of-boundary prediction samples, prediction samples in the extended area (denoted as 1110 in FIG. 11) are generated by taking the reference samples at the nearby integer positions (using floor( ) operation on the coordinates) directly without interpolation, and the normal 8-tap motion compensation interpolation filter is used to generate prediction samples within the CU (denoted as 1120 in FIG. 11). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_1x_flag is 1 for either of the two reference pictures, then BDOF is also disabled. When a CU is coded with symmetric MVD mode or CIIP mode, BDOF is also disabled.

2.4. Decoder Side Motion Vector Refinement (DMVR)

Figure 12:
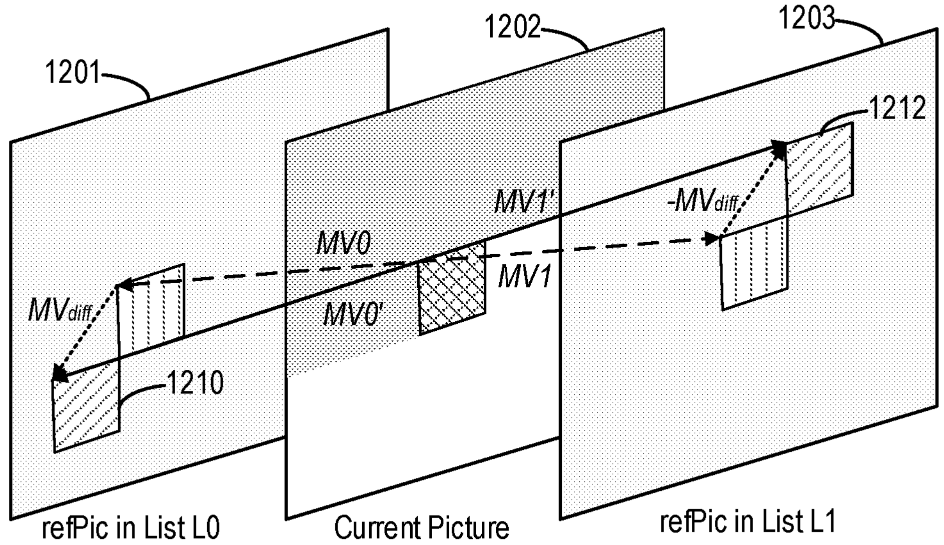
FIG. 12 illustrates a schematic diagram of decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate reference blocks in the reference picture list L0 and list L1. FIG. 12 illustrates a schematic diagram of decoding side motion vector refinement. As illustrated in FIG. 12, the sum of absolute difference (SAD) between the blocks 1210, 1212 based on each MV candidate around the initial MV is calculated, where the block 1210 is in a reference picture 1201 in the list L0 and the block 1212 is in a reference picture 1203 in the List L1 for the current picture 1202. The MV candidate with the lowest SAD becomes the refined MV and used to generate the bi-predicted signal.

In VVC, the application of DMVR is restricted and is only applied for the CUs which are coded with following modes and features:

- CU level merge mode with bi-prediction MV,
- One reference picture is in the past and another reference picture is in the future with respect to the current picture,
- The distances (i.e. POC difference) from two reference pictures to the current picture are same,
- Both reference pictures are short-term reference pictures,
- CU has more than 64 luma samples,
- Both CU height and CU width are larger than or equal to 8 luma samples,
- BCW weight index indicates equal weight,
- WP is not enabled for the current block,
- CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.4.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset} \tag{2-16}$$

$$MV1' = MV1 - \text{MV\_offset} \tag{2-17}$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \tag{2-18}$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0)) / (2(E(-1, 0) + E(1, 0) - 2E(0, 0))) \tag{2-19}$$

-continued $$y_{min} = (E(0, -1) - E(0, 1)) / (2((E(0, -1) + E(0, 1) - 2E(0, 0))) \tag{2-20}$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

2.4.2. Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.4.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

3. Motion Compensated Temporal Filtering

Motion compensated temporal filtering (MCTF) was proposed for VTM (see P. Wennersten, etc., "AHG10: Encoder-only GOP-based temporal filter," JVET-O0549, June. 2019; J. Enhorn, etc., "AHG10: Performance of the GOP-based temporal filter in VTM-6.1," JVET-P0328, October 2019; P. Wennersten, etc., "[AHG10] GOP-based temporal filter improvements," JVET-U0056, December 2020). The temporal filter process includes a hierarchical motion estimation scheme to produce motion compensated reference pictures. Several reference pictures that precede the current picture in output order and additionally, for random access, several pictures that follow the current picture in output order are motion compensated relative to the current picture. A bilateral filter is then applied to calculate the resulting filtered samples. The weights in the bilateral filter depend on the temporal sample difference (sample-wise difference and block level difference), the distance between the reference picture and the current picture, and on the Quantizer Parameter (QP) value. The filtered pictures are used for encoding and the original unfiltered pictures are used for BD-rate calculations.

Step 1: A picture is read by the encoder.

Step 2: If the picture is low enough in the coding hierarchy in a Group of Pictures (GOP), it is filtered before encoding. Otherwise the picture is encoded without filtering.

Step 3: For RA (Random Access), up to 4 neighboring pictures before and after the original picture are read. In cases where e.g., the original picture is the first picture or close to be the last picture, only the available pictures are read.

Step 4: A motion estimation and motion compensation method is applied on the neighboring pictures. This is done on 8×8 luma blocks.

Figure 13:
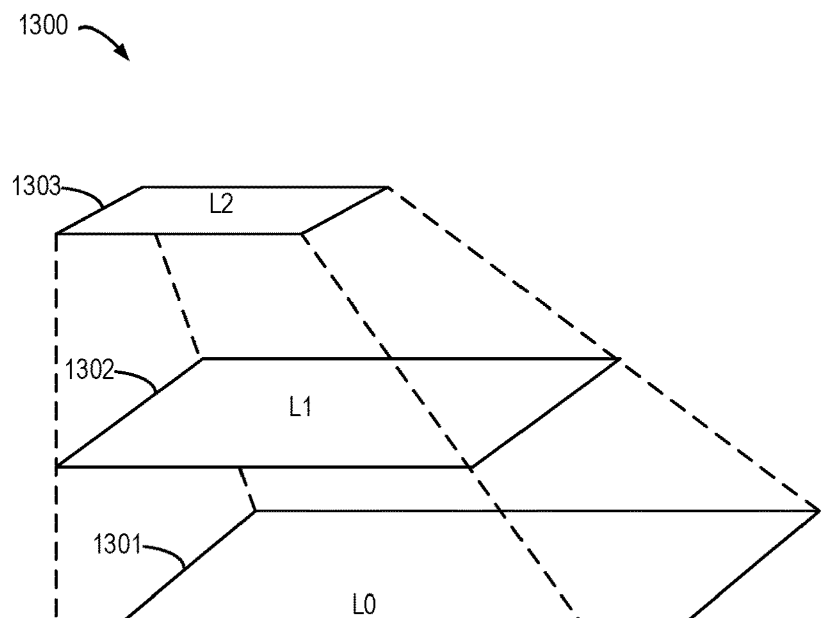
FIG. 13 illustrates a schematic diagram of layers of the hierarchical motion estimation.

A hierarchical motion estimation scheme is used, and the subsampling is illustrated in a hierarchical structure 1300 in FIG. 13 where picture L0 1301 is the current picture. Picture L1 1302 is generated by averaging 2×2 blocks of the sample values in L0. Then picture L2 1303 is generated by averaging 2×2 blocks of sample values in L1. Motion estimation is done by a first L2 full-pel motion vector search. The best motion vector is then scaled and used as a starting point for a full-pel search in L1. The best motion vector found then is again scaled and used as a starting point for a full-pel search in L0 that is followed by a final 16th sub-pel search. Motion compensation is then applied.

Step 5: All sample values of the original picture are replaced by filtered sample values. For luma samples, the weight of a reference sample, $w_r(i,a)$, is calculated as follows:

$$w_r(i, a) = bw \cdot s_o \cdot s_r(i, a) \cdot e^{-\frac{\Delta I(i)^2}{sw \cdot \sigma_I(QP)^2}} \quad (2\text{-}21)$$

Where the base weight bw is 0.4 and the sigma weight sw is 2 and ΔI(i) is the difference between a current sample and a reference sample of the current sample. The weight is also adjusted based on a simple frequency measurement, with weaker filtering when the temporal difference is of low frequency, since such differences tend to be cheaper to code, and thus are more likely to be coded. Correspondingly, we use stronger filtering when the temporal difference has higher frequency.

Step 6: The filtered picture is encoded.

3.1. Block Error Weighing

Here, we compute an error E for each 8×8 block and reference frame. Let SSD be the sum of squared differences between the original block and the corresponding block in the reference frame after motion compensation, and let V be the variance of the original block. Then E is computed as:

$$E = 0.2 \cdot \frac{SSD + 5}{V + 5} + \frac{SSD}{3200}$$

If E is less than 50, the base weight for pixels from this reference frame in this block is multiplied by 1.2. If E is more than 100, the base weight is multiplied by 0.6. If E is more than 50, the sigma weight is multiplied by 0.8.

3.2. Block Frequency Weighing

Here, we compute a frequency metric F for each 8×8 block and reference frame. To do this, we first compute the pixel-wise difference between the original block and the corresponding block in the reference frame after motion compensation, to create a difference block D. We calculate the sum of squared differences between horizontally neighboring values in D, called HSD, and the same for the vertically neighboring values, VSD. Finally, we calculate the normal sum of squared values of D, SSD. We then compute F as $$F = \frac{300 \cdot SSD + 50}{10 \cdot HSD \cdot VSD + 50}$$

If F is larger or equal 25, the base weight for pixels from this reference frame in this block is multiplied by 0.6, and sigma weight is multiplied by 0.8.

3.3. Reference Frame Weighing

The existing filter in VTM has a weight $s_o$ that depends on the temporal distance between the original frame and the reference frame. When reference frames are only available in one direction, $s_o$ is 1.2 and 1.0 for distance 1 and 2 respectively. When reference frames are available in both directions, the weights are 0.85 and 0.6.

We have modified the filter to use up to use four frames in either direction, when available. The new base weights are 1.13, 0.97, 0.81 and 0.57 for distances 1, 2, 3 and 4 when only one direction is available, and 0.85, 0.57, 0.41 and 0.33 otherwise.

In addition, the weight is modified based on the block error E described in section 2.1. We compute the minimum E for each temporally adjacent block to the current block. Then the weights in each block are multiplied by $$\frac{\min(E) + 1}{E + 1}$$

3.4. Motion Estimation Changes

We made three changes to motion estimation performed by the filter. First, the pass to determine the final 8×8 motion vector for each block no longer does any full-pel motion search. Second, the zero-motion vector is always evaluated after retrieving the best nearby vector from the higher temporal layer. Finally, after fractional motion estimation, we consider switching to the final motion vectors from the above and left blocks.

4. Problems

In the current MCTF, there are several problems:

1. When a reference picture is available, it is always used for filtering the current picture even if it belongs to different scene from the current picture, which is unreasonable.
2. A pyramid motion estimation method is employed to search blocks in reference pictures that may reference a current block in the encoding process. However, such method cannot be adapted to different encoding process.
3. A fixed block size is used in the motion estimation process, which may be unreasonable.
4. The chroma components are not considered in the motion estimation process.
5. For a currently block, only one reference block is identified on a reference picture.
6. Only translational motion model is considered in the motion estimation, which is inefficient for video with rotation, zooming etc.
7. parameter $\sigma_I(QP)$ in Eq. (2-21) are fixed and cannot be adapt to the true distribution.

5. Invention

Improvements for the temporal filtering are proposed to address the above-mentioned problems.

The detailed inventions below should be considered as examples to explain general concepts. These inventions should not be interpreted in a narrow way. Furthermore, these inventions can be combined in any manner.

1. Whether a reference picture could be used for filtering a current picture may be determined adaptively.
   a. In one example, when a reference picture belongs to a difference scene (e.g., a scene change is detected)

from the current picture, it may not be used for filtering the current picture.

b. In one example, when a reference picture is not similar to the current picture, it may not be used for filtering the current picture.

i. For example, motion estimation is performed on the reference picture to find reference blocks for the at least one block of the current picture. When the difference between the at least one block and the corresponding reference blocks is greater than a first threshold, the reference picture may not be used for filtering the current picture.

ii. For example, when the difference between a reference picture and a current picture is greater than a second threshold, the reference picture may not be used for filtering the current picture.

iii. The first or/and second threshold may depend on the content of the video or/and the current picture. For example, a larger threshold may be used for a picture with a larger gradient/variance.

iv. The first or/and second threshold may depend on the resolution of the video.

v. Different first or/and second thresholds may be applied to luma and component components.

vi. The first or/and second threshold may depend on the block size of motion estimation.

2. Whether a reference block could be used for filtering a current block may be determined adaptively.

a. In one example, when the difference between a reference block and a current block is greater than a third threshold, the reference block may not be used for filtering the current block.

i. The third threshold may depend on the content of the video or/and the current picture. For example, a larger threshold may be used for a picture with a larger gradient/variance.

ii. The third threshold may depend on the resolution of the video.

iii. Different thresholds may be applied to luma and component components.

iv. The third threshold may depend on the block size of motion estimation.

3. The reference picture number may depend on but not limited to maximum available reference picture number, video resolution, speed requirement of application scenario, bitrate, temporal layer.

a. In one example, the reference picture number may be fewer than or equal to the maximum available reference picture number.

b. In one example, different numbers of reference pictures may be used for videos of different resolutions.

c. In one example, fewer reference pictures may be used if fast encoding is required.

d. In one example, different numbers of reference pictures may be used for different bitrates.

i. For example, more reference pictures may be used for high bitrate.

e. In one example, different numbers of reference pictures may be used for pictures at different temporal layers.

i. For example, more reference pictures may be used for pictures at low temporal layers.

4. Whether the picture would be filtered may be determined by but not limited to reference picture number, video resolution, speed requirement of application scenario, bitrate, temporal layer.

a. In one example, the current picture may not be filtered if no reference picture is available.

b. In one example, different numbers of pictures may be filtered for different video resolutions.

c. In one example, fewer pictures may be filtered if fast encoding is required.

i. For example, the current picture may be filtered every N frames. (N>1)

d. In one example, different numbers of pictures may be filtered for different bitrates.

e. In one example, pictures at high temporal layers may not be filtered.

5. Reconstructed pictures may be used as reference pictures of temporal filtering, instead of the original pictures.

6. Weighting of the reference blocks may depend on but not limited to reference picture number, reference distance, prediction direction, color component (luma or chroma), block size of motion estimation, bit depth, the difference between the reference block and the current block, temporal layer.

7. Higher priority may be assigned to a predetermined motion vector set in the motion estimation process.

a. In one example, for a motion vector included in the predetermined set, the difference between a current block and a reference block identified by the motion vector may be reduced.

i. For example, the difference may be reduced by N percent, e.g., N=25.

ii. For example, the difference may be reduced by a const.

b. In one example, the predetermined motion vector set may contain the zero motion vector.

8. The block size used in the motion estimation process may be determined adaptively.

a. In one example, the block size may be determined adaptively for an area or a processing unit (e.g., a CTU, a CTU row, a tile, a slice, a picture, or a video).

b. In one example, a larger block size may be used for an area/processing unit with slower motion.

c. In one example, a larger block size may be used for an area/processing unit with smoother content.

i. For example, smoothness may be defined by gradients or/and variances.

d. In one example, the block size may be determined based on coding information (e.g., motion vector information, or/and block size information, or/and split information, or/and cost information, or/and residual information) of already encoded pictures/tiles/slices/CTUs/CUs/PUs (Prediction Units)/blocks etc.

e. In one example, the block size may be determined based on motion vector information or/and cost information that is already derived in the pyramid motion estimation process.

f. In one example, the block size may be determined by but not limited to reference picture number, video resolution, speed requirement of application scenario, bitrate, bit depth, temporal layer.

9. Fractional motion estimation in temporal filtering may not be used.

a. In one example, fractional motion estimation may be disabled when fast encoding is required.

b. In one example, fractional motion estimation may be disabled adaptively.

i. For example, fractional motion estimation may be disabled for videos with screen content.

10. It is proposed that in the pyramid motion estimation, information derived in a first layer may be used to determine parameters or/and enablement of methods in a second layer.
    a. In one example, the methods may include assigning a higher priority to a predetermined MV set (as described in bullet 7).
        i. For example, when the ratio of zero MV to all MVs in the first layer is less than a threshold, such method may be disabled in the second layer.
    b. In one example, the information obtained in the first layer may be used to decide the block size used in motion estimation of the second layer.
        i. In one example, cost (e.g., mean squared error) associated with at least one MV in the first layer may be used to decide the block size.
    c. In one example, information derived in at least one layer higher than a current layer may be used to determine parameters or/and enablement of methods for the current layer.
11. It is proposed that parameters used for deriving a weight of a reference sample may be adaptively determined according to the prediction picture (i.e., with the MV info, a reference sample can be generated for each sample of the current picture) and the original picture.
    a. In one example, the parameters may include $\sigma_l(QP)$ in Eq. (2-21). For example, it may be derived dependent on the variance of the difference between the prediction picture and the original picture.
12. Instead of using a fixed parameter $\sigma_l(QP)$ in Eq. (2-21), the parameter is considered as a random variable. Meanwhile, a weight of a reference sample may be derived according to a distribution of the parameter.
    a. In one example, $\sigma_l(QP)$ is assumed to be normally distributed.
    b. In one example, only a subset of the values of the random variable are used for deriving a weight of the reference sample.
13. The chroma components may be considered in the motion estimation process.
    a. For example, the difference between a current chroma block and a reference chroma block identified by a motion vector (may be scaled before being used) may be included in the cost of the motion vector.
14. More than one reference blocks may be identified on a reference picture for a current block.
    a. In on example, different reference blocks may be obtained by performing the motion estimation with different block sizes.
    b. In on example, different reference blocks may be obtained by using the motion vectors derived at different pyramid layers.
    c. In one example, reference blocks corresponding to M (M>=1) smallest costs may be used.
15. Value of a motion vector may be penalized in the motion estimation process.
    a. For example, lambda*(abs(mv_x)+abs(mv_y)) may be included in the cost of a motion vector, wherein lambda may depend on the QP value, and mv_x and mv_y are the horizontal and vertical component of a motion vector, respectively.
    b. Alternatively, a motion vector predictor may be derived for a block (e.g., based on motion vectors of neighboring blocks or/and motion vectors derived in a higher pyramid layer) and the difference between a motion vector and the motion vector predictor may be penalized.
16. Multi-pass encoding may be performed to improve the temporal filtering.
    a. In one example, motion vectors generated in the i-th encoding process may be used in the temporal filtering of the (i+1)-th encoding process.
17. The affine model may be considered in the temporal filtering process.
    a. For example, 4-parameter or/and 6-parameter affine model may be used in the motion estimation/motion compensation process.
    b. Whether the affine model is considered may be determined adaptively.
        i. For example, the affine motion model may be considered only when it is also enabled in the encoding process.
        ii. For example, the determination may depend on the ratio of affine coded blocks to all blocks.
    c. Furthermore, PROF may be used in the affine prediction.
18. OBMC may be employed to improve the prediction of the current picture.
19. BDOF may be employed to improve the prediction of the current picture.
20. DMVR may be employed to improve the motion vector of a block.
21. Information derived in the pre-analysis process (wherein the inter cost and intra cost are derived for blocks in the subsampled source pictures) may be used in the temporal filtering process.
    a. In one example, motion vectors derived in the pre-analysis process may be used in the temporal filtering process.
    b. In one example, intra cost and inter cost derived in the pre-analysis process may be used for determining weight of a reference block or a reference sample in the filtering process.
22. Motion vectors derived in the temporal filtering process may be used in the mode decision process.
    a. In one example, motion vectors derived in the temporal filtering process may be used for determining the start searching point of a CU/PU/MB (macroblock)/block.
23. Motion vectors derived in the temporal filtering process may be used in the pre-analysis process.
24. Spatial filtering may be performed for at least one sample of a picture.
    a. In one example, at least one direction may be determined for a block or an area.
        i. The at least one direction may be determined according to gradient of at least one sample within the area.
        ii. The at least one direction may be from the allowed intra prediction directions.
            (i) Alternatively, furthermore, intra prediction of at least one sample within in the area may be derived.
            (ii) Alternatively, difference between the at least one sample and its prediction sample may be used to determine the direction.
    b. In one example, neighboring samples of an area may be filtered using samples within the area.
        i. For example, above neighboring samples of the area may be filtered.

ii. For example, left neighboring samples of the area may be filtered.

c. The weighting of a sample within the area may be determined according to the difference between it and at least one neighboring sample.

d. In one example, only samples at predefined positions may be filtered.

i. In one example, only samples at CTU boundaries may be filtered.

ii. In one example, only samples at right or/and bottom CTU boundaries may be filtered.

iii. In one example, only samples at boundaries of M×N grid may be filtered.

Figure 14:
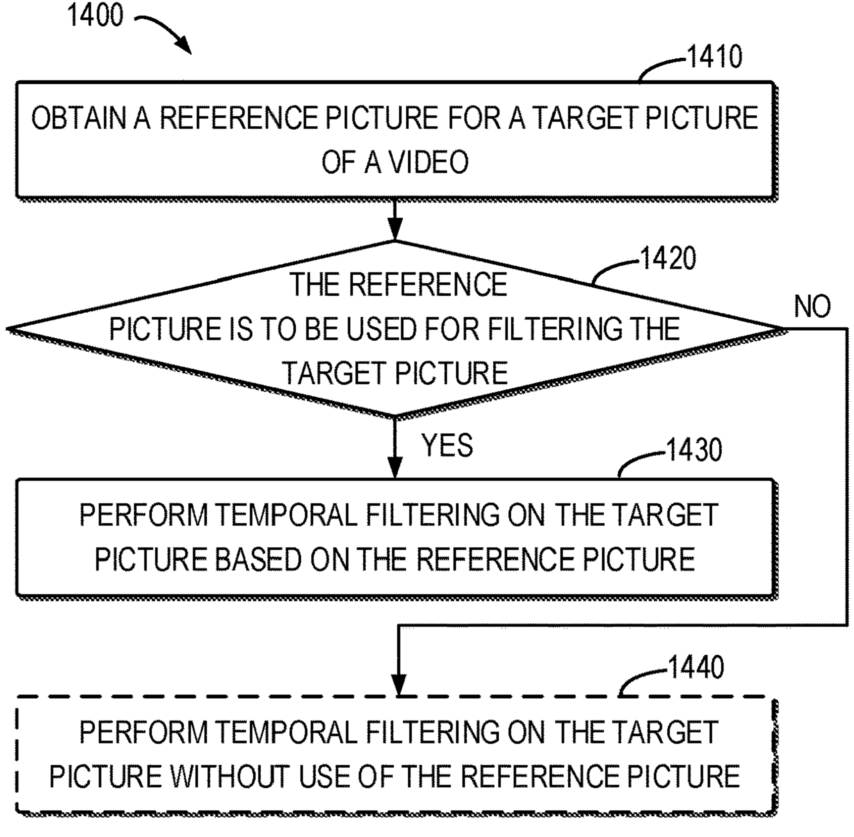
FIG. 14 illustrates a flowchart of a method for video processing in accordance with some embodiments of the present disclosure.

FIG. 14 illustrates a flowchart of a method 1400 for video processing in accordance with some embodiments of the present disclosure. The method 1400 is related to implementations of temporal filtering.

At block 1410, a reference picture is obtained for a target picture of a video. At block 1420, it is determined whether the reference picture is to be used for filtering the target picture based at least in part on a difference between the reference picture and the target picture. As used herein, a "target picture" may be referred to as a current picture of a video which is to be coded. In accordance with a determination that the reference picture is to be used for filtering the target picture, at block 1430, temporal filtering is performed on the target picture based on the reference picture. In some embodiments, in accordance with a determination that the reference picture is to be used for filtering the target picture, at block 1440, the temporal filtering is performed on the target picture without use of the reference picture.

According to the embodiments of the present disclosure, the method 1400 enables adaptive determination of whether a reference picture could be used for filtering a target picture. As such, some reference picture may not need to be used for filtering the reference picture. Compared with the conventional solution for temporal filtering which requires all the available reference pictures to be used for temporal filtering of the target picture, the solution proposed herein can advantageously improve the coding speed and efficiency.

In some embodiments, the method 1400 may be implemented at a source device 100, for example, at the video encoder 114 or 200.

In some embodiments, it is determined at a picture level whether the reference picture is to be used for filtering the target picture.

Specifically, in some embodiments, to determine whether the reference picture is to be used for filtering the target picture at the picture level, a scene difference between the reference picture and the target picture is detected. If the scene difference indicates that the reference picture belongs to a same scene as the target picture, it may be determined that the reference picture is to be used for filtering the target picture. Otherwise, if the scene difference indicates a scene change between the reference picture and the target picture, which means that the reference picture belongs to a difference scene (e.g., a scene change is detected) from the target picture, it may be determined that the reference picture is not to be used for filtering the target picture.

Alternatively, or in addition, to determine whether the reference picture is to be used for filtering the target picture at the picture level, an overall pixel difference between the reference picture and the target picture may be determined, and it is determined whether the reference picture is to be used for filtering the target picture based on the overall pixel difference.

In some embodiments, the overall pixel difference is determined by determining at least one reference block for at least one target block of the target picture by performing a motion estimation process; and for each of the at least one reference block and a corresponding target block, determining a block pixel difference between the reference block and the target block. A first overall pixel difference is determined based on at least one block pixel difference determined for the at least one reference block and the at least one target block.

In some examples, motion estimation is performed on the reference picture to find a reference block for each target block of the target picture. In some examples, a reference block may be determined for each of a plurality of target blocks in the target picture, and a plurality of block pixel differences between a plurality of pairs of reference block and target block may be determined. The first overall pixel difference may be determined based on the plurality of block pixel differences. In the case where more than one pixel block difference is determined, the first overall difference may be determined by averaging the pixel block differences, or by aggregating the pixel block differences in any other ways. In the case where only one pixel block difference is determined, the first overall difference may be determined as the pixel block difference.

In some embodiments, with the first overall pixel difference is determined, the first overall pixel difference may be compared with a first difference threshold. If it is determined that the first overall pixel difference is below a first difference threshold, the reference picture may be used for filtering the target picture. If it is determined that the first overall pixel difference exceeds the first difference threshold, the reference picture may not to be used for filtering the target picture.

In some embodiments, the overall pixel difference is determined by determining a second overall pixel difference between the reference picture and the target picture based on pixels in the reference picture and pixels in the target picture. In this case, no motion estimation is needed to identify the reference block(s) for the target block(s) of the target picture. The overall pixel difference is measured directly by differences between pixels in the reference picture and pixels in the target picture. Thus, the complexity can be reduced and the coding speed can be improved.

In some embodiments, with the second overall pixel difference is determined, the second overall pixel difference may be compared with a second difference threshold. If the second overall pixel difference is below (e.g., lower than or equal to) a second difference threshold, the reference picture may be used for filtering the target picture. If the second overall pixel difference exceeds the second difference threshold, the reference picture may not to be used for filtering the target picture.

In some embodiments, it may be adaptively determined at a block level whether the reference picture is to be used for the target picture. Specifically, a reference block of the reference picture may be determined for a target block of the target picture, and it is determined whether the reference block is to be used for filtering the target block. In this case, if it is determined that the reference block is to be used for filtering the target block, the temporal filtering may be performed on the target block based on the reference block. In some examples, for a certain reference picture, some reference blocks may be used for filtering some target blocks of the target picture, while some other reference blocks may not be used for filtering some other target blocks of the target picture. The temporal filtering based on the reference picture may be determined in a finer granularity.

In some embodiments, to determine whether the reference block is to be used for filtering the target block, a block pixel difference between the reference block and the target block may be determined. This block pixel difference may be compared with a third difference threshold. If the block pixel difference is below (e.g., lower than or equal to) a third difference threshold, the reference block may be to be used for filtering the target block. If the block pixel difference exceeds the third difference threshold, it may be determined that the reference block is not to be used for filtering the target block.

As mentioned above, in some embodiments, the first difference threshold, the second difference threshold, and/or the third difference threshold may be used to compare with certain determined pixel difference so as to determine whether the reference picture or a reference block of the reference picture is to be used for temporal filtering of the target picture or its target block. The first difference threshold, the second difference threshold, and/or the third difference threshold may be determined based on various factors.

In some embodiments, the first difference threshold, the second difference threshold, and/or the third difference threshold may be determined based on content of the target picture and/or the target picture, for example, based on a gradient or variance of the content. As an example, the first difference threshold, the second difference threshold, and/or the third difference threshold may be set to larger values if a larger gradient or variance of the content is detected from the video and/or the target picture.

In some embodiments, the first difference threshold, the second difference threshold, and/or the third difference threshold may be determined based on a resolution of the video.

In some embodiments, the first difference threshold, the second difference threshold, and/or the third difference threshold may be determined based on a color component of pixels that is used in calculating the overall pixel difference and/or the block pixel difference. The color component may comprise a luma component and/or a chroma component. In some examples, an overall pixel difference or block pixel difference based on the luma component and another overall pixel difference or block pixel difference based on the chroma component may be determined and used to determine whether the reference picture or a reference block of the reference picture is to be used for filtering the target picture or a target block of the target picture. In these cases, different values of the first difference threshold, the second difference threshold, and/or the third difference threshold may be applied to the luma component and the chroma component.

In some embodiments, the first difference threshold, the second difference threshold, and/or the third difference threshold may be determined based on a block size of motion estimation performed on the reference picture with respect to the target picture.

It should be appreciated that although some factors for determining the first difference threshold, the second difference threshold, and/or the third difference threshold are provided above, those factors may be used separately or in any combination to determine the first difference threshold, the second difference threshold, and/or the third difference threshold. It should also be appreciated that some other factors may also be used in combination or separately with those factors provided herein to set the first difference threshold, the second difference threshold, and/or the third difference threshold.

In some embodiments, for a predetermined set of motion vectors in the motion estimation process, a higher priority may be assigned to the predetermined set of motion vectors as compared with other motion vectors. In some embodiments, the predetermined set of motion vectors at least comprises at least one zero motion vector.

With the priority assignment, when performing motion estimation for the target picture, a difference between a candidate reference block of the reference picture and a target block of the target picture may be determined. The candidate reference block is identified by a candidate motion vector. It is further determined whether the candidate motion vector that identifies the candidate reference block is included in the predetermined set of motion vectors for the target picture with the high priority assigned. If the candidate motion vector is included in the predetermined set of motion vectors, the difference between the candidate reference block and the target block is reduced. Then a motion vector for the target block is determined based on the reduced difference. As a result of the motion estimation, this motion vector may identify a reference block of the reference picture for the target block of the target picture. It may further determine whether the temporal filtering of the target block is to be performed based on the reference block identified by the determined motion vector, as discussed above.

According to the embodiments related to the priority assignment to the set of motion vectors, for the smaller motion vectors (such as zero motion vectors), the candidate reference blocks identified by those motion vectors may be prioritized in being used as reference blocks for the target blocks and may probably be used for filtering the target blocks of the target picture. Such prioritizing may be implemented by reducing the direct difference between the reference block and the target block.

In some embodiments, the difference may be reduced by a predetermined percent (represented as N percent). For example, N may be 25 or any other value. In some embodiments, the difference may be reduced by a predetermined constant value. It should be appreciated that the reduction of the difference may be performed in many other ways and the scope of the present disclosure is not limited in this regard.

In some embodiments, a hierarchical motion estimation (also referred to as "pyramid motion estimation") process may be performed on the reference picture with respect to the target picture. The hierarchical motion estimation may be performed as described with reference to FIG. 13. The hierarchical motion estimation process comprises a plurality of motion estimations to be performed at a plurality of hierarchical layers.

For example, in FIG. 13, three motion estimations are performed, where a motion estimation is performed at a hierarchical layer for picture L2 1303, a motion estimation is performed at a hierarchical layer for picture L1 1302, and a motion estimation is performed at a hierarchical layer for picture L0 1301 which is the target picture. In this example of FIG. 13, the hierarchical layer for picture L2 1303 is higher than the hierarchical layer for picture L1 1302 which is higher than the hierarchical layer for picture L0 1301, and the motion estimations are performed from the higher hierarchical layer to the lower hierarchical layer.

In the embodiments where the hierarchical motion estimation process is applied, information derived in at least one hierarchical layer may be used to determine parameters and/or enablement of methods in another hierarchical layer. In the embodiments, information used in one hierarchical layer is shared in motion estimation in another hierarchical layer. In one example, information derived in at least one layer higher than a current layer may be used to determine parameters or/and enablement of methods for the current layer.

In particular, in the above-mentioned embodiments where a higher priority may be assigned to a predetermined set of motion vectors, if the predetermined set of motion vectors are determined from a first motion estimation at a first hierarchical layer of the plurality of hierarchical layers, then it is determined whether priority assignment is enabled or not for the predetermined set of motion vectors based on information derived in at least one second motion estimation performed at at least one second hierarchical layer of the plurality of hierarchical layers. If it is determined that the priority assignment is enabled, the predetermined priority can be assigned to the predetermined set of motion vectors. In some embodiments, the at least one second hierarchical layer is higher than the first hierarchical layer.

For example, in FIG. 13, for the hierarchical layer for picture L1 1302, motion vectors for the picture L1 1302 may be generated by performing a motion estimation on this picture (which is subsampled from the target picture L0 1301). At this time, motion estimation at the hierarchical layer for the picture L2 1303 may have been performed, and information derived in this motion estimation may be used to determine whether the priority assignment is enabled or not for a predetermined set of motion vectors generated at the hierarchical layer for the picture L1 1302. In this example, the first hierarchical layer in the above-mentioned embodiments may include the lower hierarchical layer for the picture L1 1302, and the at least one second hierarchical layer may include the higher hierarchical layer for the picture L2 1303.

In a further example, in FIG. 13, for the hierarchical layer for picture L0 1301, motion vectors for the picture L0 1301 may be generated by performing a motion estimation on this picture. At this time, motion estimations at the hierarchical layers for the picture L2 1303 and the picture L1 1302 may have been performed, and information derived in the two motion estimations may be used to determine whether the priority assignment is enabled or not for a predetermined set of motion vectors generated at the hierarchical layer for the picture L0 1301. In this example, the first hierarchical layer in the above-mentioned embodiments may include the lowest hierarchical layer for the picture L0 1301, and the at least one second hierarchical layer may include the higher hierarchical layers for the picture L2 1303 and the picture L1 1302.

In some embodiments, the information derived in the at least one second motion estimation that is used to determine enablement of the priority assignment may comprises at least one set of motion vectors derived in the at least one second motion estimation. In some embodiments, to determine whether priority assignment is enabled for the predetermined set of motion vectors, a ratio of zero motion vectors to all motion vectors in each of the at least one set of motion vectors may be determined. If the ratio exceeds a ratio threshold, which means that a relatively larger number of zero motion vectors are determined at the higher hierarchical layer, then it is determined that the priority assignment is enabled at the lower hierarchical layer. Otherwise, if the ratio is below the ratio threshold (e.g., lower than or equal to the ratio threshold), then it is determined that the priority assignment is disabled at the lower hierarchical layer.

According to those embodiments of the present disclosure, by reusing the information that is already derived in a hierarchical layer of the hierarchical motion estimation process, the determination of whether the priority assignment is enabled or not is more accurate.

It should be appreciated that the information derived in at least one layer higher than a current layer may be used to determine parameters or/and enablement of other methods for the current layer. Some embodiments of using such information will be further discussed below.

In some embodiments, a maximum number of reference pictures that are to be used for filtering the target picture may be determined. The maximum number of reference pictures may be based on at least one of the following: the number of available reference pictures for the target picture, a resolution of the video, an encoding speed requirement for the video, a bitrate for the video, or a temporal layer of the target picture. It should be appreciated that the maximum number of reference pictures may alternatively or additionally depend on one or more other factors, and the scope of the present disclosure is not limited in this regard.

In some embodiments, for a certain target picture, the number of available reference pictures may be determined, which may be a fixed number for the certain target picture. According to the embodiments of the present disclosure, the maximum number of reference pictures that are to be used for filtering the target picture may be less than or equal to the maximum number of available reference pictures.

In some embodiments, different maximum numbers of reference pictures may be determined for videos of different resolutions.

In some embodiments, if fast encoding is required for the video, the maximum number of reference pictures for the target picture may be set to a lower value.

In some embodiments, different maximum numbers of reference pictures may be determined for videos of different bitrates. For example, a larger maximum number of reference pictures may be determined for a higher bitrate.

In some embodiments, different maximum numbers of reference pictures may be determined for different temporal layers where the target picture is located. More specifically, when determining the maximum number of reference pictures based on the temporal layer of the target picture, if the target picture is at a first temporal layer, a first maximum number of reference pictures may be determined the target picture; if the target picture is at a second temporal layer lower than the first temporal layer, a second maximum number of reference pictures may be determined for the target picture, where the second maximum number is greater than the first maximum number. In other words, if the target picture is at a lower temporal layer, a larger maximum number of reference pictures may be determined for the target picture.

According to those embodiments, by determining the maximum number of reference pictures for the target picture adaptively, the coding performance, such as the coding speed and efficiency, may be further improved.

In some embodiments, with the maximum number determined, the maximum number of reference pictures may be from the number of available reference pictures for the target picture. Among all the maximum number of reference pictures, each reference picture may be selected and it may be adaptively determined whether each reference picture could be used for filtering the target picture. Since it is adaptively determined whether a reference picture can be used for filtering the target picture, if the number of reference pictures that are determined as can be used for filtering the target pictures is larger than the maximum number of reference pictures, some reference pictures may be further omitted in filtering the target picture.

In some embodiments, it may be further adaptively determined whether the target picture would be filtered. In some embodiments, it may be determined whether the temporal filtering is to be performed on the target picture based on at least one of the following: the number of reference pictures that are to be used for filtering the target picture, a resolution of the video, an encoding speed requirement for the video, a bitrate for the video, or a temporal layer of the target picture. It should be appreciated that one or more other factors may be additionally or alternatively used to determine whether the temporal filtering is to be performed on the target picture, and the scope of the present disclosure is not limited in this regard.

In some embodiments, the target picture may not be filtered if no reference picture is available for filtering the target picture.

In some embodiments, different total numbers of pictures in the video may be filtered for different resolutions. That is, for a video with a certain resolution, the total number of pictures that can be filtered may be determined, and if the total number of pictures is less than the total number of pictures contained in the video, some pictures may not be filtered.

In some embodiments, fewer pictures may be filtered if fast encoding is required for the video. For example, the target picture in the video may be filtered every N frames (where N>1). N may be determined based on the encoding speed requirement for the video.

In some embodiments, different numbers of pictures may be filtered for different bitrates.

In some embodiments, one or more pictures at certain temporal layers may not be filtered. For example, some or all of the pictures at high temporal layers (for example, a predetermined number of highest temporal layers) may not be filtered.

According to some embodiments of the present disclosure, by skipping the temporal filtering of some pictures in a video, the coding speed can be further improved.

In some embodiments, instead of using original pictures from the video, reconstructed pictures may be used as reference pictures in the temporal filtering. Specifically, when obtaining the reference picture for a certain target picture, it may select an original picture from the video. In some examples, the original picture may be a neighboring of the target picture. A reconstructed picture for the original picture may be generated and determined as a reference picture for the target picture.

In some embodiments, to perform the temporal filtering on the target picture, a motion estimation process (such as a hierarchical motion estimation process in FIG. 13) may be performed on the reference picture with respect to the target picture, and the temporal filtering may be performed based on a result of the motion estimation process. In some embodiments of the present disclosure, it is proposed to disable the fractional motion estimation disabled from the motion estimation process.

As described above, when applying a hierarchical motion estimation scheme, the subsampling is illustrated in a hierarchical structure 1300 in FIG. 13 where picture L0 1301 is the target picture. Picture L1 1302 is generated by averaging 2×2 blocks of the sample values in L0. Then picture L2 1303 is generated by averaging 2×2 blocks of sample values in L1. Motion estimation is done by a first L2 full-pel motion vector search. The best motion vector is then scaled and used as a starting point for a full-pel search in L1. The best motion vector found then is again scaled and used as a starting point for a full-pel search in L0 that is followed by a final 16th sub-pel search. Motion compensation is then applied, and then all sample values of the original target picture are replaced by filtered sample values. According to some embodiments of the present disclosure, the 6th sub-pel search may not be used during the motion estimation process.

In some embodiments, the fractional motion estimation may be disabled adaptively. In some embodiments, whether the fractional motion estimation is enabled or disabled may be determined based on an encoding speed requirement for the video. In one example, the fractional motion estimation may be disabled when fast encoding is required for the video. In some embodiments, alternatively or additionally, whether the fractional motion estimation is enabled or disabled may be determined based on a content type of the video. In one example, if it is determined that a video captures screen content, then the fractional motion estimation may be disabled for this video.

In some embodiments, the block size used in the motion estimation process may be determined adaptively. The motion estimation process may be the one performed for the temporal filtering. Specifically, in some embodiments, a block size may be adaptively determined for an area or a processing unit of the video, the processing unit comprising at least the target picture. The area or the processing unit may include a coding tree unit (CTU), a CTU row, a tile, a slice, a picture, or a video. With the block size determined, a target block of the target picture and at least one candidate reference block of the reference picture within the processing unit may be selected, with each of the target block and the at least one candidate reference block being of the determined block size. Then a motion estimation process may be performed on the at least one candidate reference block with respect to the target block, and the temporal filtering may be performed based on a result of the motion estimation process.

The block size may be determined based on various factors. In some embodiments, the block size may be determined based on a motion speed detected in the processing unit. In one example, a larger block size may be used for an area or processing unit with slower motion.

In some embodiments, alternatively or additionally, the block size may be determined based on a content smoothness of the processing unit. In one example, a larger block size may be used for an area/processing unit with smoother content. In some embodiments, the content smoothness of the processing unit may be determined based on may be defined by gradients and/or variances.

In some embodiments, alternatively or additionally, the block size may be determined based on coding information of at least one encoded processing unit of the video. In some embodiments, the coding information may include, but is not limited to, motion vector information, or/and block size information, or/and split information, or/and cost information, or/and residual information. In some embodiments, the at least one encoded processing unit may include, but is not limited to, at least one already encoded picture, at least one already encoded tile, at least one already encoded slice, at least one already encoded CTU, at least one already encoded CU, at least one already encoded PUs (Prediction Units), at least one already encoded block, or the like.

In some embodiments, in the case where a hierarchical motion estimation process performed for the target picture (such as in the example of FIG. 13), information that has been derived in the hierarchical motion estimation process may be used to determine the block size. In some embodiments, the block size used in the motion estimation to be performed at a first hierarchical layer may be determined based on information that has been derived from motion estimation performed at at least one second hierarchical layer. In one example, the at least one second hierarchical layer may be higher than the first hierarchical layer.

In some embodiments, the information used to determine the block size may include motion vector information and/or cost information associated with the motion vector information. In some examples, the cost (e.g., mean squared error) associated with at least one motion vector at the higher hierarchical layer may be used to determine the block size used at a lower hierarchical layer.

In some embodiments, alternatively or additionally, the block size may be determined based on one or more of the following: the number of reference pictures that are to be used for filtering the target picture, a resolution of the video, an encoding speed requirement for the video, a bitrate for the video, a bit depth for the video, or a temporal layer of the target picture.

It should be appreciated that although some factors are provided above for determining the block size, those factors may be used separately or in any combination. It should also be appreciated that some other factors may also be used in combination or separately with those factors provided herein to determine the block size.

In some embodiments, when performing the temporal filtering on the target picture, e.g., a target block of the target picture, a reference block may be identified for the target block, for example, through a motion estimation process. For each target sample in the target block, a filtered sample value for the target sample may be determined by weighting at least one reference sample for the target sample. The weight of a reference sample may be determined based on various parameters.

As descried above in Section 3 (Motion compensated temporal filtering), the weight of a reference sample may be determined according to Eq. (2-21). The values of the parameters involved in Eq. (2-21) are relatively fixed. In some embodiments of the present disclosure, it is proposed that the at least one of the parameters used for deriving a weight of a reference sample may be adaptively determined based on the target picture and a predicted picture for the target picture. The predicted picture may be generated based on the reference picture through the motion estimation and compensation process.

Specifically, when performing the temporal filtering comprises: for a reference block of the reference picture to be used for filtering a target block of the target picture, a reference sample for a target sample of the target block may be determined based on the reference block, and at least one value of at least one parameter may be determined based on the target picture and a predicted picture for the target picture, the predicted picture being generated based on the reference picture and motion vector information. A weight of the reference sample may be determined based on the at least one value of the at least one parameter, and then a filtered sample value for the target sample may be determined based at least in part on the weight of the reference sample and a sample value of the reference sample.

In some embodiments, the QP-related parameter, represented by $\sigma_l(QP)$ in Eq. (2-21), may be determined adaptively. According to the conventional solution, $\sigma_l(QP)$ depend on the QP value as a fixed value. That is, each QP value is mapped to a fixed value for $\sigma_l(QP)$. In some embodiments of the present disclosure, $\sigma_l(QP)$ may be determined adaptively based at least in part on a variance of a difference between the target picture and the predicted picture.

In some embodiments, the QP-related parameter, $\sigma_l(QP)$, may be determined as having a distribution. For example, $\sigma_l(QP)$ may be considered as a random variable. In one example, $\sigma_l(QP)$ is assumed to be normally distributed. In some embodiments, the weight of the reference sample may be determined based at least in part on at least a subset of values in the distribution of the QP-related parameter. In one example, only a subset of the values of the random variable $\sigma_l(QP)$ may be used for deriving the weight of the reference sample. In one example, all the values of the random variable $\sigma_l(QP)$ may be used for deriving the weight of the reference sample. The weight of the reference sample may be used to weighting the sample value of the reference sample when determining a filtered sample value for the target sample in the target block of the target picture.

In some embodiments, the chroma component may be considered in the motion estimation process. Specifically, a motion estimation process may be performed based at least in part on chroma components of pixels in the reference picture and in the target picture. According to the conventional solution, when performing the motion estimation, the difference between luma components of pixels in a reference block and a target block is calculated and used to determine a cost of a motion vector identifying the reference block. According to the embodiments of the present disclosure, as an alternative or in addition to the luma components, the difference between the chroma components of the pixels may also be used to determine the cost of the motion vector identifying a reference block. In this way, the cost information may be determined in a more accurate way, and the motion estimation performance and thus the coding performance can be improved.

In some embodiments, a plurality of reference blocks may be identified on a reference picture for a target block of the target picture, and the temporal filtering may be performed on the target block based on the plurality of reference blocks. Instead of using only one reference block for a target block, the coding performance can be further improved with the use of a plurality of different reference blocks.

In some embodiments, the plurality of reference blocks may be identified by performing a motion estimation process with different block sizes.

In some embodiments, a hierarchical motion estimation process may be performed on the reference picture (for example, as illustrated in the example of FIG. 13) where the hierarchical motion estimation process comprises a plurality of motion estimations to be performed at a plurality of hierarchical layers. From each of the plurality of motion estimations performed at the plurality of hierarchical layers, one motion vector may be determined for a target block of the target picture. The plurality of motion vectors may be used to identify a plurality of reference blocks from the reference picture and those reference blocks may be used for the target block of the target picture.

In some embodiments, a set of candidate motion vectors may be determined for a target block of the target picture by performing a motion estimation process on the reference picture. Respective costs of those candidate motion vectors may be determined and then a plurality of motion vectors may be selected from the set of candidate motion vectors based on the respective costs of the set of candidate motion vectors. In some embodiments, a predetermined number (e.g., M) of motion vectors corresponding to the smallest costs may be selected, where M may be an integer larger than one. Reference blocks corresponding to (or identified by) the selected motion vectors may be determined from the reference picture and used as reference blocks for the target block of the target picture.

In some embodiments, a value of a motion vector may be penalized in the motion estimation process. In some embodiments, with a motion vector for a target block of the target picture determined, a cost of the motion vector may be determined by penalizing the motion vector based on a parameter value depending on a QP value and coordinates components of the motion vector. For example, lambda*(abs(mv_x)+abs(mv_y)) may be included in the cost of a motion vector, where lambda represents a parameter depending on the QP value, mv_x and mv_y are the horizontal and vertical components of a motion vector, respectively; and abs( ) represents deriving the absolute value.

During the motion estimation process, a reference block of the reference picture may be determined for the target block based at least in part on the cost of the motion vector. For example, one or more motion vectors with the smallest cost(s) may be selected and the reference block(s) corresponding to the selected motion vector(s) may be used. The temporal filtering on the target block may be performed based on the determined reference block(s).

In some embodiments, a motion vector predictor may be determined for a target block of the target picture. The motion vector predictor may be determined based on motion vectors of neighboring blocks and/or motion vectors derived in a higher hierarchical layer in the case that the hierarchical motion estimation is performed. With a motion vector for a target block of the target picture determined, a difference between the motion vector and the motion vector predictor may be penalized. The penalized difference may be used to determine a reference block of the reference picture for the target block. Then temporal filtering on the target block may be performed based on at least the determined reference block.

In some embodiments, multi-pass encoding may be performed to improve the temporal filtering. For a certain target picture, the temporal filtering may be performed in a plurality of encoding passes. During a first encoding pass of the plurality of encoding passes, temporal filtering may be performed on a target block of the target picture based on at least one motion vector for a target block of the target picture that has been generated during a second encoding pass of the plurality of encoding passes. That is, at least one motion vector generated in the i-th encoding process may be used in the temporal filtering of the (i+1)-th encoding process.

In some embodiments, the affine motion model may be considered in the temporal filtering process. More specifically, the affine motion model may be applied in a motion estimation and compensation process performed for the temporal filtering. Then the temporal filtering may be performed based on a result of the motion estimation and compensation process.

In some embodiments, the affine motion model comprises at least one of a 4-parameter affine model or a 6-parameter affine model, such as the 4-parameter affine model 510 or the 6-parameter affine model 520 in FIG. 5.

In some embodiments, whether the affine motion model is applied may be determined adaptively. In some embodiments, whether the affine motion model is applicable may be determined based on whether it is enabled in an encoding process for the target picture. For example, the affine motion model may be applied in the motion estimation and compensation process when it is also enabled in the encoding process. In some embodiments, alternatively or additionally, whether the affine motion model is applicable may be determined based on a ratio of affine coded blocks to all blocks. If it is determined that the affine motion model is applicable, the motion estimation and compensation process may be determined by applying the affine motion model. Otherwise, the affine motion model may not be considered.

In some embodiments, prediction refinement with optical flow (PROF) may be used in the prediction based on the affine motion model. PROF may be used to refine the subblock based affine motion compensated prediction without increasing the memory access bandwidth for motion compensation.

In some embodiments, when performing the temporal filtering on the target picture, overlapped block motion compensation (OBMC), and/or bi-directional optical flow (BDOF) may also be applied in prediction of the target picture, which prediction may be performed during the motion estimation and compensation process for the temporal filtering.

During the temporal filtering, when performing the motion estimation, a motion vector may be determined for a target block of the target picture. In some embodiments, decoder side motion vector refinement (DMVR) may be applied on the motion vector, to refine the motion vector obtain a refined motion vector. Then a reference block of the reference picture may be determined for the target block based at least in part on the refined motion vector. Subsequently, the temporal filtering may be performed on the target block based on the determined reference block.

In some embodiments, when performing the temporal filtering, information derived in a pre-analysis process on the target picture may be used in the temporal filtering process.

In some embodiments, the information derived in the pre-analysis process comprises at least one of the following: at least one motion vector for at least one target block of the target picture, an intra cost derived in the pre-analysis process, or an inter cost derived in the pre-analysis process. During the pre-analysis process, motion vectors may be derived, and the inter cost and intra cost may be derived for blocks in the subsampled source pictures. Such information may be reused for the temporal filtering process. As such, the coding speed may be further improved.

In some embodiments, when performing the temporal filtering based on the information derived in the pre-analysis process, a weight of a reference block or a reference sample of the reference picture may be determined based on at least one of the intra cost or the inter cost.

In some embodiments, at least one motion vector derived in the temporal filtering process may be used in the mode decision process. Specifically, an encoding mode for the video may be determined based on at least one motion vector for the target picture that is generated in the temporal filtering. In some embodiments, a start searching point of a processing unit of the video may be based on the at least one motion vector. The processing unit comprises one of a coding unit (CU), a prediction unit (PU), a macroblock (MB), or a block.

In some embodiments, a pre-analysis process on the target picture may be determined based on at least one motion vector for the target picture that is generated in the temporal filtering. As such, the coding speed may be further improved.

In some embodiments, spatial filtering may be performed for at least one sample of the target picture. In some examples, the spatial filtering may be performed in addition to the temporal filtering. In some other examples, one of the spatial filtering and the temporal filtering may be performed.

In some embodiments, when performing the spatial filtering, at least one spatial direction in the target picture may be determined for a block or an area of the target picture. The spatial filtering may be performed on the block or the area of the target picture in the at least one spatial direction.

In some embodiments, the at least one spatial direction may be determined based on a gradient of at least one sample in the block or the area. Alternatively, or in addition, the at least one spatial direction may be determined based on at least one allowed intra prediction direction for the block or the area. The at least one spatial direction may be selected from the at least one allowed intra prediction direction. In some embodiments, the intra prediction of at least one sample within the block or the area may be derived. In some embodiments, as an alternative or in addition, the at least one spatial direction may be determined based on a difference between at least one sample in the block or the area and at least one predicted sample for the at least one sample.

In some embodiments, when performing the spatial filtering, at least one neighboring sample of an area or a block may be filtered using at least one sample within the area or a block. In some embodiments, the at least one neighboring sample comprises at least one of the following: at least one or all of the above neighboring samples of the area or the block, or at least one or all of the left neighboring samples of the area or the block.

In some embodiments, when performing the spatial filtering, for each of the at least one sample within the block or the area, a weight for the sample may be determined based on a difference between the sample and at least one neighboring sample. The spatial filtering on the sample may be performed based on the weight for the sample.

In some embodiments, the at least one sample to be filtered may be selected from at least one predefined position in the target picture. For example, only samples at predefined positions may be filtered.

In some embodiments, the at least one predefined position may comprise at least one of the following: at least one position at at least one boundary of a coding tree unit (CTU), or at least one position at at least one boundary of a grid with a predetermined size (for example, a M×N grid). In some embodiments, the at least one boundary of the CTU may comprise at least one of a right boundary or a bottom boundary of the CTU.

Implementations of the present disclosure can be described in view of the following clauses, the features of which can be combined in any reasonable manner.

Clause 1. A method for video processing, comprising: obtaining a reference picture for a target picture of a video; determining whether the reference picture is to be used for filtering the target picture based at least in part on a difference between the reference picture and the target picture; and in accordance with a determination that the reference picture is to be used for filtering the target picture, performing temporal filtering on the target picture based on the reference picture.

Clause 2. The method of Clause 1, wherein determining whether the reference picture is to be used for filtering the target picture comprises: determining an overall pixel difference between the reference picture and the target picture; and determining whether the reference picture is to be used for filtering the target picture based on the overall pixel difference.

Clause 3. The method of Clause 2, wherein determining the overall pixel difference comprises: determining at least one reference block for at least one target block of the target picture by performing a motion estimation process; for each of the at least one reference block and a corresponding target block, determining a block pixel difference between the reference block and the target block; and determining a first overall pixel difference based on at least one block pixel difference determined for the at least one reference block and the at least one target block.

Clause 4. The method of Clause 3, wherein determining whether the reference picture is to be used for filtering the target picture based on the overall pixel difference comprises: in accordance with a determination that the first overall pixel difference is below a first difference threshold, determining that the reference picture is to be used for filtering the target picture; and in accordance with a determination that the first overall pixel difference exceeds the first difference threshold, determining that the reference picture is not to be used for filtering the target picture.

Clause 5. The method of Clause 2, wherein determining the overall pixel difference comprises: determining a second overall pixel difference between the reference picture and the target picture based on pixels in the reference picture and pixels in the target picture.

Clause 6. The method of Clause 5, wherein determining whether the reference picture is to be used for filtering the target picture based on the overall pixel difference comprises: in accordance with a determination that the second overall pixel difference is below a second difference threshold, determining that the reference picture is to be used for filtering the target picture; and in accordance with a determination that the second overall pixel difference exceeds the second difference threshold, determining that the reference picture is not to be used for filtering the target picture.

Clause 7. The method of Clause 1, wherein determining whether the reference picture is to be used for filtering the target picture comprises: determining a reference block of the reference picture for a target block of the target picture; and determining whether the reference block is to be used for filtering the target block, and wherein performing the temporal filtering comprises: in accordance with a determination that the reference block is to be used for filtering the target block, performing the temporal filtering on the target block based on the reference block.

Clause 8. The method of Clause 7, wherein determining whether the reference block is to be used for filtering the target block comprises: determining a block pixel difference between the reference block and the target block; in accordance with a determination that the block pixel difference is below a third difference threshold, determining that the reference block is to be used for filtering the target block; and in accordance with a determination that the block pixel difference exceeds the third difference threshold, determining that the reference block is not to be used for filtering the target block.

Clause 9. The method of any of Clauses 4, 6 and 8, further comprising: determining at least one of the first, the second, and the third difference thresholds based on at least one of the following: content of the target picture, content of the video, a resolution of the video, a color component of pixels, or a block size of motion estimation performed on the reference picture with respect to the target picture.

Clause 10. The method of Clause 1, wherein performing the temporal filtering comprises: determining a difference between a candidate reference block of the reference picture and a target block of the target picture; determining whether a candidate motion vector that identifies the candidate reference block is included in a predetermined set of motion vectors for the target picture, the predetermined set of motion vectors being assigned with a predetermined priority; in accordance with a determination that the candidate motion vector is included in the predetermined set of motion vectors, reducing the difference between the candidate reference block and the target block; determining a motion vector for the target block based on the reduced difference; and performing the temporal filtering on the target block based on the determined motion vector.

Clause 11. The method of Clause 10, wherein the predetermined set of motion vectors at least comprises at least one zero motion vector.

Clause 12. The method of Clause 10, wherein a hierarchical motion estimation process is performed on the reference picture, the hierarchical motion estimation process comprising a plurality of motion estimations to be performed at a plurality of hierarchical layers, and wherein information used in one hierarchical layer is shared in motion estimation in another hierarchical layer.

Clause 13. The method of Clause 12, wherein the method further comprises: determining whether priority assignment is enabled for the predetermined set of motion vectors at a first hierarchical layer of the plurality of hierarchical layers based on information derived in at least one second motion estimation performed in at least one second hierarchical layer of the plurality of hierarchical layers; and in accordance with a determination that the priority assignment is enabled, assigning the predetermined priority to the predetermined set of motion vectors at the first hierarchical layer.

Clause 14. The method of Clause 13, wherein the information derived in the at least one second motion estimation comprises at least one set of motion vectors derived in the at least one second motion estimation, and wherein determining whether priority assignment is enabled for the predetermined set of motion vectors comprises: determining a ratio of zero motion vectors to the at least one set of motion vectors; in accordance with a determination that the ratio exceeds a ratio threshold, determining that the priority assignment is enabled; and in accordance with a determination that the ratio is below the ratio threshold, determining that the priority assignment is disabled.

Clause 15. The method of Clause 13, wherein the at least one second hierarchical layer is higher than the first hierarchical layer.

Clause 16. The method of Clause 1, wherein determining whether the reference picture is to be used for filtering the target picture comprises: detecting a scene difference between the reference picture and the target picture; in accordance with a determination that the scene difference indicates that the reference picture belongs to a same scene as the target picture, determining that the reference picture is to be used for filtering the target picture; and in accordance with a determination that the scene difference indicates a scene change between the reference picture and the target picture, determining that the reference picture is not to be used for filtering the target picture.

Clause 17. The method of any of Clauses 1 to 16, further comprising: determining a maximum number of reference pictures that are to be used for filtering the target picture based on at least one of the following: the number of available reference pictures for the target picture, a resolution of the video, an encoding speed requirement for the video, a bitrate for the video, or a temporal layer of the target picture.

Clause 18. The method of Clause 17, wherein determining the maximum number of reference pictures based on the temporal layer of the target picture comprises: in accordance with a determination that the target picture is at a first temporal layer, determining a first maximum number of reference pictures for the target picture; and in accordance with a determination that the target picture is at a second temporal layer lower than the first temporal layer, determining a second maximum number of reference pictures for the target picture, the second maximum number being greater than the first maximum number.

Clause 19. The method of Clause 17, wherein obtaining the reference picture comprises: selecting the maximum number of reference pictures from the number of available reference pictures for the target picture; and selecting the reference picture from the maximum number of reference pictures.

Clause 20. The method of any of Clauses 1-19, further comprising: determining whether the temporal filtering is to be performed on the target picture based on at least one of the following: the number of reference pictures that are to be used for filtering the target picture, a resolution of the video, an encoding speed requirement for the video, a bitrate for the video, or a temporal layer of the target picture.

Clause 21. The method of any of Clauses 1-20, wherein obtaining the reference picture comprises: selecting an original picture from the video; generating a reconstructed picture for the original picture; and determining the reconstructed picture as the reference picture for the target picture.

Clause 22. The method of any of Clauses 1-21, wherein performing the temporal filtering comprises: performing a motion estimation process on the reference picture with respect to the target picture, with fractional motion estimation disabled from the motion estimation process; and performing the temporal filtering based on a result of the motion estimation process.

Clause 23. The method of Clause 22, wherein performing the motion estimation process comprises: determining whether the fractional motion estimation is enabled or disabled based on at least one of the following: an encoding speed requirement for the video, or a content type of the video; and in accordance with a determination that the fractional motion estimation is disabled, disabling the fractional motion estimation from the motion estimation process.

Clause 24. The method of any of Clauses 1-23, wherein performing the temporal filtering comprises: determining a block size for a processing unit of the video, the processing unit comprising at least the target picture; selecting a target block of the target picture and at least one candidate reference block of the reference picture within the processing unit, the target block and the at least one candidate reference block being of the block size; and performing a motion estimation process on the at least one candidate reference block with respect to the target block; and performing the temporal filtering based on a result of the motion estimation process.

Clause 25. The method of Clause 24, wherein determining the block size comprises: determining the block size based on at least one of the following: a motion speed detected in the processing unit, a content smoothness of the processing unit, coding information of at least one encoded processing unit of the video, motion vector information that has been derived in a hierarchical motion estimation process performed for the target picture, cost information associated with the motion vector information, the number of reference pictures that are to be used for filtering the target picture, a resolution of the video, an encoding speed requirement for the video, a bitrate for the video, a bit depth for the video, or a temporal layer of the target picture.

Clause 26. The method of any of Clauses 1-25, wherein performing the temporal filtering comprises: for a reference block of the reference picture to be used for filtering a target block of the target picture, determining a reference sample for a target sample of the target block based on the reference block; and determining at least one value of at least one parameter based on the target picture and a predicted picture for the target picture, the predicted picture being generated based on the reference picture and motion vector information, determining a weight of the reference sample based on the at least one value of the at least one parameter, and determining a filtered sample value for the target sample based at least in part on the weight of the reference sample and a sample value of the reference sample.

Clause 27. The method of Clause 26, wherein the at least one parameter comprises a quantizer parameter (QP)-related parameter, and wherein determining the at least one parameter value comprises: determining a value of the QP-related parameter based at least in part on a variance of a difference between the target picture and the predicted picture.

Clause 28. The method of any of Clauses 1-25, wherein a QP-related parameter is set according to a distribution, and wherein performing the temporal filtering comprises: for a reference block of the reference picture to be used for filtering a target block of the target picture, determining a reference sample for a target sample of the target block based on the reference block; determining a weight of the reference sample based at least in part on at least a subset of values in the distribution of the QP-related parameter; and determining a filtered sample value for the target sample based at least in part on the weight of the reference sample and a sample value of the reference sample.

Clause 29. The method of any of Clauses 1-28, wherein performing the temporal filtering comprises: performing a motion estimation process based at least in part on chroma components of pixels in the reference picture and in the target picture; and performing the temporal filtering based on a result of the motion estimation process.

Clause 30. The method of any of Clauses 1-29, wherein performing the temporal filtering comprises: identifying, from the reference picture, a plurality of reference blocks for a target block of the target picture; and performing the temporal filtering on the target block based on the plurality of reference blocks.

Clause 31. The method of Clause 30, wherein identifying the plurality of reference blocks comprises: identifying the plurality of reference blocks by performing a motion estimation process with different block sizes.

Clause 32. The method of Clause 30, wherein a hierarchical motion estimation process is performed on the reference picture, the hierarchical motion estimation process comprising a plurality of motion estimations to be performed at a plurality of hierarchical layers, and wherein identifying the plurality of reference blocks comprises: determining a plurality of motion vectors for the target block from the plurality of motion estimations; and determining a plurality of reference blocks from the reference picture that are identified by the plurality of motion vectors.

Clause 33. The method of Clause 30, wherein identifying the plurality of reference blocks comprises: determining a set of candidate motion vectors for the target block by performing a motion estimation process on the reference picture; selecting a plurality of motion vectors from the set of candidate motion vectors based on respective costs of the set of candidate motion vectors; and determining a plurality of reference blocks from the reference picture that are identified by the plurality of motion vectors.

Clause 34. The method of any of Clauses 1-33, wherein performing the temporal filtering comprises: determining a motion vector for a target block of the target picture; determining a cost of the motion vector by penalizing the motion vector based on a parameter value depending on a QP value and coordinates components of the motion vector; determining a reference block of the reference picture for the target block based at least in part on the cost of the motion vector; and performing the temporal filtering on the target block based on the determined reference block.

Clause 35. The method of any of Clauses 1-33, wherein performing the temporal filtering comprises: determining a motion vector predictor for a target block of the target picture; determining a motion vector for a target block of the target picture; penalized a difference between the motion vector and the motion vector predictor; determining a reference block of the reference picture for the target block based at least in part on the penalized difference; and performing the temporal filtering on the target block based on the determined reference block.

Clause 36. The method of any of Clauses 1-35, wherein the temporal filtering is performed in a plurality of encoding passes for the target picture, and wherein performing the temporal filtering comprises: during a first encoding pass of the plurality of encoding passes, performing temporal filtering on a target block of the target picture based on at least one motion vector for a target block of the target picture that has been generated during a second encoding pass of the plurality of encoding passes.

Clause 37. The method of any of Clauses 1-36, wherein performing the temporal filtering comprises: performing a motion estimation and compensation process by applying an affine motion model; and performing the temporal filtering based on a result of the motion estimation and compensation process.

Clause 38. The method of Clause 37, wherein the affine motion model comprises at least one of a 4-parameter affine model or a 6-parameter affine model.

Clause 39. The method of Clause 37, wherein performing the motion estimation and compensation process comprises: determining whether the affine motion model is applicable based on at least one of the following: whether the affine motion model is enabled in an encoding process for the target picture, or a ratio of affine coded blocks to all blocks; and in accordance with a determination that the affine motion model is applicable, performing the motion estimation and compensation process by applying the affine motion model.

Clause 40. The method of any of Clauses 1-39, wherein performing the temporal filtering comprises: applying at least one of the following in prediction of the target picture: overlapped block motion compensation (OBMC), or bi-directional optical flow (BDOF).

Clause 41. The method of any of Clauses 1-40, wherein performing the temporal filtering comprises: determining a motion vector for a target block of the target picture; applying decoder side motion vector refinement (DMVR) on the motion vector, to obtain a refined motion vector; determining a reference block of the reference picture for the target block based at least in part on the refined motion vector; and performing the temporal filtering on the target block based on the determined reference block.

Clause 42. The method of any of Clauses 1-41, wherein performing the temporal filtering comprises: obtaining information derived in a pre-analysis on the target picture; and performing the temporal filtering based on the information.

Clause 43. The method of Clause 42, wherein the information derived in the pre-analysis process comprises at least one of the following: at least one motion vector for at least one target block of the target picture, an intra cost derived in the pre-analysis process, or an inter cost derived in the pre-analysis process.

Clause 44. The method of Clause 43, wherein performing the temporal filtering based on the information comprises: determining a weight of a reference block or a reference sample of the reference picture based on at least one of the intra cost or the inter cost.

Clause 45. The method of any of Clauses 1-44, further comprising: determining an encoding mode for the video based on at least one motion vector for the target picture that is generated in the temporal filtering.

Clause 46. The method of Clause 45, wherein determining the encoding mode comprises: determining a start searching point of a processing unit of the video based on the at least one motion vector, the processing unit comprises one of a coding unit (CU), a prediction unit (PU), a macroblock (MB), or a block.

Clause 47. The method of any of Clauses 1-46, further comprising: performing a pre-analysis process on the target picture based on at least one motion vector for the target picture that is generated in the temporal filtering.

Clause 48. The method of any of Clauses 1-47, further comprising: performing spatial filtering on at least one sample of the target picture.

Clause 49. The method of Clause 48, wherein performing the spatial filtering comprises: determining at least one spatial direction in the target picture for a block or an area of the target picture; and performing the spatial filtering on the block or the area of the target picture in the at least one spatial direction.

Clause 50. The method of Clause 49, wherein determining the at least one spatial direction comprises: determining the at least one spatial direction based on at least one of the following: a gradient of at least one sample in the block or the area, at least one allowed intra prediction direction for the block or the area, or a difference between at least one sample in the block or the area and at least one predicted sample for the at least one sample.

Clause 51. The method of Clause 48, wherein performing the spatial filtering comprises: performing the spatial filtering on at least one neighboring sample of an area or a block using at least one sample within the area or a block.

Clause 52. The method of Clause 51, wherein the at least one neighboring sample comprises at least one of the following: at least one above neighboring sample of the area or the block, or at least one left neighboring sample of the area or the block.

Clause 53. The method of Clause 48, wherein performing the spatial filtering comprises: for each of the at least one sample, determining a weight for the sample based on a difference between the sample and at least one neighboring sample; and performing the spatial filtering on the sample based on the weight for the sample.

Clause 54. The method of Clause 48, further comprising: selecting the at least one sample to be filtered from at least one predefined position in the target picture.

Clause 55. The method of Clause 54, wherein the at least one predefined position comprises at least one of the following: at least one position at at least one boundary of a coding tree unit (CTU), or at least one position at at least one boundary of a grid with a predetermined size.

Clause 56. The method of Clause 55, wherein the at least one boundary of the CTU comprises at least one of a right boundary or a bottom boundary of the CTU.

Clause 57. An electronic device, comprising: processing unit; and a memory coupled to the processing unit and having instructions stored thereon which, when executed by the processing unit, cause the electronic device to perform a method in accordance with any of Clauses 1-56.

Clause 58. A non-transitory computer-readable storage medium storing instructions that cause a processor to perform a method in accordance with any of Clauses 1-56.

Clause 59. A non-transitory computer-readable recording medium storing a bitstream of a video which is generated by a method in accordance with any of Clauses 1-56, wherein the method is performed by a video processing apparatus.

Example Device

Figure 15:
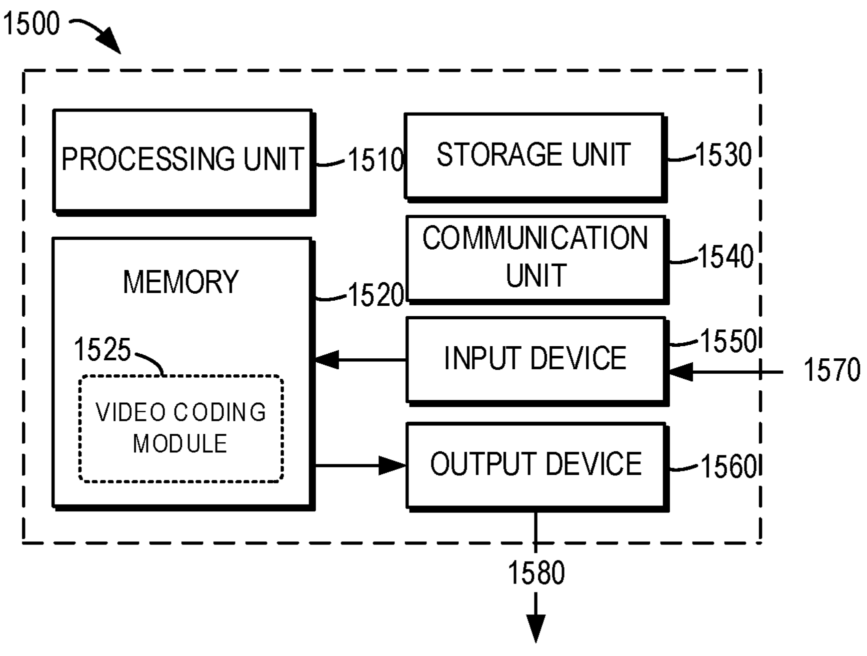
FIG. 15 illustrates a block diagram of a computing device in which various embodiments of the present disclosure can be implemented.

FIG. 15 illustrates a block diagram of a computing device 1500 in which various embodiments of the present disclosure can be implemented. The computing device 1500 may be implemented as or included in the source device 110 (or the video encoder 114 or 200) or the destination device 120 (or the video decoder 124 or 300).

It would be appreciated that the computing device 1500 shown in FIG. 15 is merely for purpose of illustration, without suggesting any limitation to the functions and scopes of the embodiments of the present disclosure in any manner.

As shown in FIG. 15, the computing device 1500 includes a general-purpose computing device 1500. The computing device 1500 may at least comprise one or more processors or processing units 1510, a memory 1520, a storage unit 1530, one or more communication units 1540, one or more input devices 1550, and one or more output devices 1560.

In some embodiments, the computing device 1500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1500 can support any type of interface to a user (such as "wearable" circuitry and the like).

The processing unit 1510 may be a physical or virtual processor and can implement various processes based on programs stored in the memory 1520. In a multi-processor system, multiple processing units execute computer executable instructions in parallel so as to improve the parallel processing capability of the computing device 1500. The processing unit 1510 may also be referred to as a central processing unit (CPU), a microprocessor, a controller or a microcontroller.

The computing device 1500 typically includes various computer storage medium. Such medium can be any medium accessible by the computing device 1500, including, but not limited to, volatile and non-volatile medium, or detachable and non-detachable medium. The memory 1520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1530 may be any detachable or non-detachable medium and may include a machine-readable medium such as a memory, flash memory drive, magnetic disk or another other media, which is to be used for storing information and/or data and can be accessed in the computing device 1500.

The computing device 1500 may further include additional detachable/non-detachable, volatile/non-volatile memory medium. Although not shown in FIG. 15, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1540 communicates with a further computing device via the communication medium. In addition, the functions of the components in the computing device 1500 can be implemented by a single computing cluster or multiple computing machines that can communicate via communication connections. Therefore, the computing device 1500 can operate in a networked environment using a logical connection with one or more other servers, networked personal computers (PCs) or further general network nodes.

The input device 1550 may be one or more of a variety of input devices, such as a mouse, keyboard, tracking ball, voice-input device, and the like. The output device 1560 may be one or more of a variety of output devices, such as a display, loudspeaker, printer, and the like. By means of the communication unit 1540, the computing device 1500 can further communicate with one or more external devices (not shown) such as the storage devices and display device, with one or more devices enabling the user to interact with the computing device 1500, or any devices (such as a network card, a modem and the like) enabling the computing device 1500 to communicate with one or more other computing devices, if required. Such communication can be performed via input/output (I/O) interfaces (not shown).

In some embodiments, instead of being integrated in a single device, some or all components of the computing device 1500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1500 may be used to implement video encoding/decoding in embodiments of the present disclosure. The memory 1520 may include one or more video coding modules 1525 having one or more program instructions. These modules are accessible and executable by the processing unit 1510 to perform the functionalities of the various embodiments described herein.

In the example embodiments of performing video encoding, the input device 1550 may receive video data as an input 1570 to be encoded. The video data may be processed, for example, by the video coding module 1525, to generate an encoded bitstream. The encoded bitstream may be provided via the output device 1560 as an output 1580.

In the example embodiments of performing video decoding, the input device 1550 may receive an encoded bitstream as the input 1570. The encoded bitstream may be processed, for example, by the video coding module 1525, to generate decoded video data. The decoded video data may be provided via the output device 1560 as the output 1580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

obtaining, for a conversion between a target picture of a video and a bitstream of the video, a reference picture for the target picture of the video;

determining whether the reference picture is to be used for filtering the target picture based at least in part on a difference between the reference picture and the target picture;

in accordance with a determination that the reference picture is to be used for filtering the target picture, performing temporal filtering on the target picture based on the reference picture; and performing the conversion based on the temporal filtering, wherein determining whether priority assignment is enabled for a predetermined set of motion vectors at a first hierarchical layer of a plurality of hierarchical layers based on information derived in at least one second motion estimation comprises:

determining a ratio of zero motion vectors to the at least one set of motion vectors;

in accordance with a determination that the ratio exceeds a ratio threshold, determining that the priority assignment is enabled; and in accordance with a determination that the ratio is below the ratio threshold, determining that the priority assignment is disabled, wherein the information derived in the at least one second motion estimation comprises at least one set of motion vectors derived in the at least one second motion estimation.

2. The method of claim 1, wherein determining whether the reference picture is to be used for filtering the target picture comprises:

determining an overall pixel difference between the reference picture and the target picture; and determining whether the reference picture is to be used for filtering the target picture based on the overall pixel difference.

3. The method of claim 2, wherein determining the overall pixel difference comprises:

determining at least one reference block for at least one target block of the target picture by performing a motion estimation process;

for each of the at least one reference block and a corresponding target block, determining a block pixel difference between the reference block and the target block; and determining a first overall pixel difference based on at least one block pixel difference determined for the at least one reference block and the at least one target block.

4. The method of claim 3, wherein determining whether the reference picture is to be used for filtering the target picture based on the overall pixel difference comprises:

in accordance with a determination that the first overall pixel difference is below a first difference threshold, determining that the reference picture is to be used for filtering the target picture; and in accordance with a determination that the first overall pixel difference exceeds the first difference threshold, determining that the reference picture is not to be used for filtering the target picture.

5. The method of claim 1, wherein performing the temporal filtering comprises:

determining a difference between a candidate reference block of the reference picture and a target block of the target picture;

determining whether a candidate motion vector that identifies the candidate reference block is included in the predetermined set of motion vectors for the target picture, the predetermined set of motion vectors being assigned with a predetermined priority;

in accordance with a determination that the candidate motion vector is included in the predetermined set of motion vectors, reducing the difference between the candidate reference block and the target block;

determining a motion vector for the target block based on the reduced difference; and performing the temporal filtering on the target block based on the determined motion vector, wherein the predetermined set of motion vectors at least comprises at least one zero motion vector, and/or wherein a hierarchical motion estimation process is performed on the reference picture, the hierarchical motion estimation process comprising a plurality of motion estimations to be performed at the plurality of hierarchical layers, and wherein information used in one hierarchical layer is shared in motion estimation in another hierarchical layer.

6. The method of claim 1, wherein a hierarchical motion estimation process is performed on the reference picture, the hierarchical motion estimation process comprising a plurality of motion estimations to be performed at the plurality of hierarchical layers, and wherein the method further comprises:

determining whether the priority assignment is enabled for the predetermined set of motion vectors at the first hierarchical layer of the plurality of hierarchical layers based on information derived in the at least one second motion estimation performed in at least one second hierarchical layer of the plurality of hierarchical layers; and in accordance with the determination that the priority assignment is enabled, assigning the predetermined priority to the predetermined set of motion vectors at the first hierarchical layer, wherein the at least one second hierarchical layer is higher than the first hierarchical layer.

7. The method of claim 1, further comprising:

determining a maximum number of reference pictures that are to be used for filtering the target picture based on at least one of the following:

a number of available reference pictures for the target picture, a resolution of the video, an encoding speed requirement for the video, a bitrate for the video, or a temporal layer of the target picture.

8. The method of claim 7, wherein determining the maximum number of reference pictures based on the temporal layer of the target picture comprises:

in accordance with a determination that the target picture is at a first temporal layer, determining a first maximum number of reference pictures for the target picture; and in accordance with a determination that the target picture is at a second temporal layer lower than the first temporal layer, determining a second maximum number of reference pictures for the target picture, the second maximum number being greater than the first maximum number.

9. The method of claim 1, further comprising:

determining whether the temporal filtering is to be performed on the target picture based on at least one of the following:

a number of reference pictures that are to be used for filtering the target picture, a resolution of the video, an encoding speed requirement for the video, a bitrate for the video, or a temporal layer of the target picture.

10. The method of claim 1, wherein performing the temporal filtering comprises:

performing a motion estimation process on the reference picture with respect to the target picture, with fractional motion estimation disabled from the motion estimation process; and performing the temporal filtering based on a result of the motion estimation process.

11. The method of claim 10, wherein performing the motion estimation process comprises:

determining whether the fractional motion estimation is enabled or disabled based on at least one of the following:

an encoding speed requirement for the video, or a content type of the video; and in accordance with a determination that the fractional motion estimation is disabled, disabling the fractional motion estimation from the motion estimation process.

12. The method of claim 1, wherein performing the temporal filtering comprises:

determining a motion vector predictor for a target block of the target picture;

determining a motion vector for a target block of the target picture;

penalizing a difference between the motion vector and the motion vector predictor;

determining a reference block of the reference picture for the target block based at least in part on the penalized difference; and performing the temporal filtering on the target block based on the determined reference block.

13. The method of claim 1, wherein performing the temporal filtering comprises:

performing a motion estimation and compensation process by applying an affine motion model; and performing the temporal filtering based on a result of the motion estimation and compensation process, wherein the affine motion model comprises at least one of a 4-parameter affine model or a 6-parameter affine model.

14. The method of claim 13, wherein performing the motion estimation and compensation process comprises:

determining whether the affine motion model is applicable based on at least one of the following:

whether the affine motion model is enabled in an encoding process for the target picture, or a ratio of affine coded blocks to all blocks; and in accordance with a determination that the affine motion model is applicable, performing the motion estimation and compensation process by applying the affine motion model.

15. The method of claim 1, wherein performing the temporal filtering comprises:

applying at least one of the following in prediction of the target picture:

overlapped block motion compensation (OBMC), or bi-directional optical flow (BDOF).

16. The method of claim 1, further comprising performing at least one of the following:

determining an encoding mode for the video based on at least one motion vector for the target picture that is generated in the temporal filtering, or performing a pre-analysis process on the target picture based on at least one motion vector for the target picture that is generated in the temporal filtering.

17. The method of claim 16, wherein determining the encoding mode comprises:

determining a start searching point of a processing unit of the video based on the at least one motion vector, the processing unit comprises one of a coding unit (CU), a prediction unit (PU), a macroblock (MB), or a block.

18. The method of claim 1, wherein the conversion includes encoding the video unit into the bitstream, or wherein the conversion includes decoding the video unit from the bitstream.

19. An electronic device, comprising:

a processing unit; and a memory coupled to the processing unit and having instructions stored thereon which, when executed by the processing unit, cause the electronic device to perform a method comprising:

obtaining, for a conversion between a target picture of a video and a bitstream of the video, a reference picture for the target picture of the video;

determining whether the reference picture is to be used for filtering the target picture based at least in part on a difference between the reference picture and the target picture;

in accordance with a determination that the reference picture is to be used for filtering the target picture, performing temporal filtering on the target picture based on the reference picture; and performing the conversion based on the temporal filtering, wherein determining whether priority assignment is enabled for a predetermined set of motion vectors at a first hierarchical layer of a plurality of hierarchical layers based on information derived in at least one second motion estimation comprises:

determining a ratio of zero motion vectors to the at least one set of motion vectors;

in accordance with a determination that the ratio exceeds a ratio threshold, determining that the priority assignment is enabled; and in accordance with a determination that the ratio is below the ratio threshold, determining that the priority assignment is disabled, wherein the information derived in the at least one second motion estimation comprises at least one set of motion vectors derived in the at least one second motion estimation.

20. A non-transitory computer-readable storage medium storing instructions that cause a processor to perform a method comprising:

obtaining a reference picture for a target picture of a video;

determining whether the reference picture is to be used for filtering the target picture based at least in part on a difference between the reference picture and the target picture;

in accordance with a determination that the reference picture is to be used for filtering the target picture, performing temporal filtering on the target picture based on the reference picture; and generating a bitstream of the video based on the temporal filtering, wherein determining whether priority assignment is enabled for a predetermined set of motion vectors at a first hierarchical layer of a plurality of hierarchical layers based on information derived in at least one second motion estimation comprises:

determining a ratio of zero motion vectors to the at least one set of motion vectors;

in accordance with a determination that the ratio exceeds a ratio threshold, determining that the priority assignment is enabled; and in accordance with a determination that the ratio is below the ratio threshold, determining that the priority assignment is disabled, wherein the information derived in the at least one second motion estimation comprises at least one set of motion vectors derived in the at least one second motion estimation.

* * * * *